(12) United States Patent
Tepper et al.

(10) Patent No.: US 11,604,834 B2
(45) Date of Patent: Mar. 14, 2023

(54) TECHNOLOGIES FOR PERFORMING STOCHASTIC SIMILARITY SEARCHES IN AN ONLINE CLUSTERING SPACE

(71) Applicant: Intel Corporation, Santa Clara, CA (US)

(72) Inventors: Mariano Tepper, Santa Clara, CA (US); Dipanjan Sengupta, Hillsboro, OR (US); Sourabh Dongaonkar, Santa Clara, CA (US); Chetan Chauhan, Folsom, CA (US); Jawad Khan, Portland, OR (US); Theodore Willke, Portland, OR (US); Richard Coulson, Portland, OR (US); Rajesh Sundaram, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 16/870,003

(22) Filed: May 8, 2020

(65) Prior Publication Data
US 2020/0265098 A1 Aug. 20, 2020

(51) Int. Cl.
*G06F 16/903* (2019.01)
*G06F 17/16* (2006.01)
*G06K 9/62* (2022.01)

(52) U.S. Cl.
CPC ........ *G06F 16/90348* (2019.01); *G06F 17/16* (2013.01); *G06K 9/6215* (2013.01); *G06K 9/6218* (2013.01)

(58) Field of Classification Search
CPC .... G06F 16/90348; G06F 17/16; G06F 16/55; G06F 16/285; G06K 9/6215; G06K 9/6218; G06K 9/6271; G06V 10/82
See application file for complete search history.

(56) References Cited

U.S. PATENT DOCUMENTS

2019/0220230 A1* 7/2019 Khan .................. G06F 12/0207

OTHER PUBLICATIONS

Lan, Yinhe, Zhenyu Weng, and Yuesheng Zhu. "Center-Adaptive Weighted Binary K-Means for Image Clustering." Advances in Multimedia Information Processing—PCM 2017. Cham: Springer International Publishing, 2018. 407-417. Web. (Year: 2018).*

(Continued)

*Primary Examiner* — Mark D Featherstone
*Assistant Examiner* — Samuel C Sharpless, III
(74) *Attorney, Agent, or Firm* — Jordan IP Law, LLC

(57) ABSTRACT

Technologies for performing stochastic similarity searches in an online clustering space include a device having a column addressable memory and circuitry. The circuitry is configured to determine a Hamming distance from a binary dimensionally expanded vector to each cluster of a set of clusters of binary dimensionally expanded vectors in the memory, identify the cluster having the smallest Hamming distance from the binary dimensionally expanded vector, determine whether the identified cluster satisfies a target size, and add or delete, in response to a determination that the identified cluster does not satisfy the target size, the binary dimensionally expanded vector to or from the identified cluster.

20 Claims, 23 Drawing Sheets

(56) References Cited

OTHER PUBLICATIONS

Yunchao Gong, M. Pawlowski, Fei Yang, L. Brandy, L. Boundev and R. Fergus, "Web scale photo hash clustering on a single machine," 2015 IEEE Conference on Computer Vision and Pattern Recognition (CVPR), 2015, pp. 19-27, doi: 10.1109/CVPR.2015.7298596. (Year: 2015).*
GSI Technology, "In-Place Computing: Scaling to 1M Similarity Searches per Second", gsitechnology.com/sites/default/files/AppNotes/AN1027.pdf, 2017, 5 pages.
European Search Report for EPO Patent Application No. 20216311.9, dated Jun. 9, 2021, 24 pages.
Lan, Yinhe et al., "Center-Adaptive Weighted Binary K-meansfor Image Clustering", ICAP International Conference on Image Analysis and Processing, 17th International Conference, Naples, Italy, May 10, 2018, 6 pages.
M. Cygan, A. Czumaj, M. Mucha, and P. Sankowski, "Online Facility Location with Deletions," in ESA, 2018.
E. Liberty, R. Sriharsha, and M. Sviridenko, "An Algorithm for Online K-Means Clustering," in 2016 Proceedings of the Eighteenth Workshop on Algorithm Engineering and Experiments (ALENEX), Proceedings, pp. 81-89. Society for Industrial and Applied Mathematics, Dec. 2015.

* cited by examiner input : Number of clusters $M$, initialization dataset $X$, streaming data set $S = \{(\mathbf{x}_i, op)\}_{i=1}^{\infty}$ were $op \in \{+, -\}$ for additions and removals, respectively.
output: Collection of centroids $C$ and an instantaneous assignment for each point in $X$ to centroids.

1 initialization($X$);
2 while has_next($S$) do  // While there are elements in $X$
3     $(\mathbf{x}, op) \leftarrow$ next($S$);  // Get the next sample from the stream
4     if $op == +$ then
5        $j^* \leftarrow$ add_point($\mathbf{x}$);
6        store_assignment($\mathbf{x}, j^*$);
7     if $op == -$ then
8        $j^* \leftarrow$ fetch_assignment($\mathbf{x}$);
9        remove_point_from_cluster($j^*$);

```
1  Function initialisation(X) is
2    Initialize k;
3    for i = 1, ..., k + 10 do
4        x ← next(X);
5        append x to C;
6        capacity([C]) ← 1;
7      yield |C|;
8    w* ← half the sum of the 10 smallest squared distances points in C to their closest neighbor in C;
9    r ← 1;  q₁ ← 0;  f₁ ← w*;
```
// The point is assigned to itself

1 Function *remove_point_from_cluster(c)* is
2     capacity(c) ← capacity(c) − 1;
3     if capacity(c) == 0 then
4        remove the c-th cluster from $C$

FIG. 19

```
 1  Function add_point(x) is
 2      j* ← argmin ||x − c_j||_2;          // Compute the center nearest to x
           j=1,...,|C|
 3      add_new_cluster ← 0;
 4      with probability p = min{||x − c_{j*}||_2^2 / f_r, 1} do
 5       └ add_new_cluster ← 1;
 6      if capacity(j*) = κ then
 7       └ add_new_cluster ← 1;
 8      if add_new_cluster then                // Probabilistically create a new cluster
 9          append x to C;
10          q_r ← q_r + 1;
11          if q_r ≥ k then                    // Decrease the cluster creation rate
12           ┌ r ← r + 1;
13           │ q_r ← 0;
14           └ f_r ← 10 * f_{r−1}
15          capacity(|C|) ← 1;
16          return |C|;                        // The point is assigned to itself
17      else
18       ┌ capacity(j*) ← capacity(j*) + 1;
19       └ return j*;                          // The point is assigned to j*
```

COMPUTE ECC ALONG COLUMN AND STORE ECC BITS USING COLUMN WRITE OPERATION

| DATA TYPE | | C0 | C1 | DATA ONLY C2 | C3 | C4 | C5 | C6 |
|---|---|---|---|---|---|---|---|---|
| | R0 | | | 0 | | | | |
| | R1 | | | 1 | | | | |
| | R2 | | | 0 | | | | |
| USER | R3 | | | 1 | | | | |
| | R4 | | | 0 | | | | |
| | R5 | | | 1 | | | | |
| | R6 | | | 1 | | | | |
| | R7 | | | 0 | | | | |
| ECC | R8 | | | | | | | |
| | R9 | | | | | | | |

| DATA TYPE | | C0 | C1 | DATA + ECC C2 | C3 | C4 | C5 | C6 |
|---|---|---|---|---|---|---|---|---|
| | R0 | | | 0 | | | | |
| | R1 | | | 1 | | | | |
| | R2 | | | 0 | | | | |
| USER | R3 | | | 1 | | | | |
| | R4 | | | 0 | | | | |
| | R5 | | | 1 | | | | |
| | R6 | | | 1 | | | | |
| | R7 | | | 0 | | | | |
| ECC | R8 | | | 1 | | | | |
| | R9 | | | 0 | | | | |

FIG. 21

FIRST SEARCH AND COPY RESULTS USING COLUMN WRITE

|    | C0 | C1 | C2 CONDITION X = TRUE | C3 | C4 | C5 | C6 COLUMN WRITE A COPY OF SEARCH FOR CONDITION X |
|----|----|----|----|----|----|----|----|
| R0 |    |    | 0  |    |    |    | 0  |
| R1 |    |    | 1  |    |    |    | 1  |
| R2 |    |    | 0  |    |    |    | 0  |
| R3 |    |    | 1  |    |    |    | 1  |
| R4 |    |    | 0  |    |    |    | 0  |
| R5 |    |    | 1  |    |    |    | 1  |
| R6 |    |    | 1  |    |    |    | 1  |
| R7 |    |    | 0  |    |    |    | 0  |
| R8 |    |    | 0  |    |    |    | 0  |

NEXT SEARCH AND CONTRAST WITH PREVIOUS RESULTS

|    | C0 | C1 | C2 CONDITION X = TRUE | C3 | C4 | C5 | C6 COLUMN WRITE A COPY OF SEARCH FOR CONDITION X |
|----|----|----|----|----|----|----|----|
| R0 |    |    | 1  |    |    |    | 0  |
| R1 |    |    | 1  |    |    |    | 1  |
| R2 |    |    | 0  |    |    |    | 0  |
| R3 |    |    | 1  |    |    |    | 1  |
| R4 |    |    | 0  |    |    |    | 0  |
| R5 |    |    | 1  |    |    |    | 1  |
| R6 |    |    | 1  |    |    |    | 1  |
| R7 |    |    | 0  |    |    |    | 0  |
| R8 |    |    | 1  |    |    |    | 0  |

RELATIVE DISTANCE OF CURRENT SEARCH FROM PREVIOUS SEARCH

SEMAPHORE: IF FLAG = TRUE THEN SET OTHER BIT(S) THROUGH ANY WRITE (COL OR ROW)

SET C6 FLAG BIT AS A PART OF ROW WRITE

| | C0 | C1 | C2 | C3 | C4 | C5 | C6 ROW WRITE SET FLAG BIT |
|---|---|---|---|---|---|---|---|
| R0 | | | | | | | |
| R1 | 1 | 0 | 1 | 0 | 0 | 0 | 1 |
| R2 | | | | | | | |
| R3 | | | | | | | |
| R4 | | | | | | | |
| R5 | | | | | | | |
| R6 | | | | | | | |
| R7 | | | | | | | |
| R8 | | | | | | | |

NEXT COLUMN SEARCH, WRITE OTHER CONDITIONS, AND COLUMN WRITE RESET OF FLAG BIT

| | C0 | C1 | C2 | C3 | C4 | C5 | C6 COLUMN READ AND COLUMN WRITE RESET FLAG BIT |
|---|---|---|---|---|---|---|---|
| R0 | | | | | | | |
| R1 | 1 | 0 | 1 | 0 | 0 | 0 | 0 |
| R2 | | | | | | | |
| R3 | | | 1 | | | | |
| R4 | | | | | | | |
| R5 | | | | | | | |
| R6 | | | | | 1 | | |
| R7 | | | | | | | |
| R8 | | | | | | | |

TECHNOLOGIES FOR PERFORMING STOCHASTIC SIMILARITY SEARCHES IN AN ONLINE CLUSTERING SPACE

BACKGROUND

Content-based similarity search, or simply similarity search, is a key technique that underpins machine learning (ML) and artificial intelligence applications (AI). In performing a similarity search, query data, such as data indicative of an object (e.g., an image) is used to search a database to identify data indicative of similar objects (e.g., similar images). Present similarity search systems typically only support a static use-case. That is, a database is built in a one-time monolithic process that requires having the entirety of the database items available for indexing. When new items are to be added to the database or when one or more items are to be deleted, the database is entirely rebuilt, consuming a significant amount of time and energy.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 17-20 are sets of pseudocode that may be utilized by the compute device of FIG. 1 to manage clusters of data for use in stochastic associative searches; and FIGS. 21-24 are diagrams of use cases for writing columns of data that may be implemented by the compute device of FIG. 1.

DETAILED DESCRIPTION OF THE DRAWINGS

Figure 1:
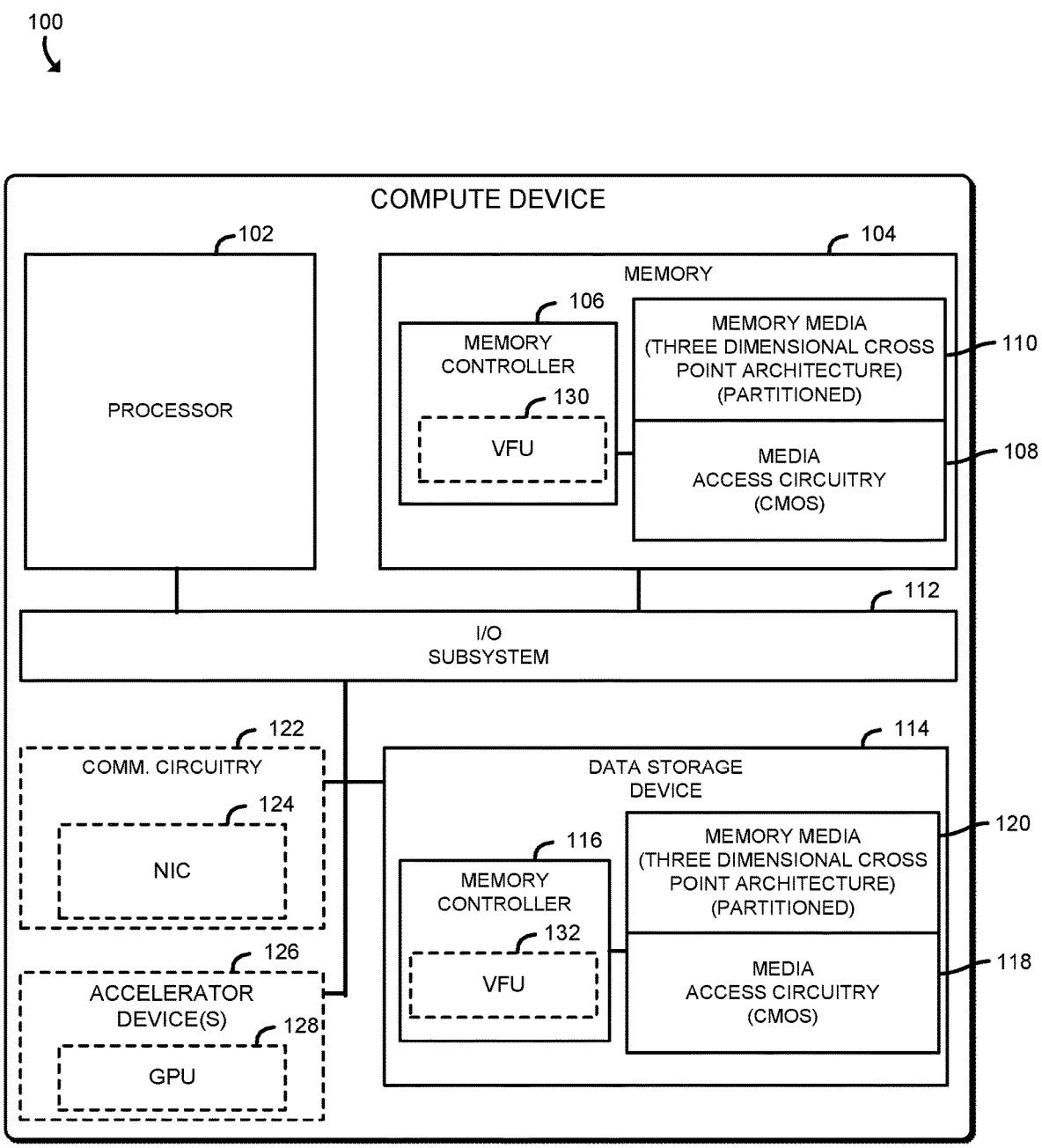
FIG. 1 is a simplified diagram of at least one embodiment of a compute device for performing similarity search using column-read enabled memory.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for performing similarity search using column-read enabled memory includes a processor 102, a memory 104, an input/output (I/O) subsystem 112, a data storage device 114, communication circuitry 122, and one or more accelerator devices 126. Of course, in other embodiments, the compute device 100 may include other or additional components, such as those commonly found in a computer (e.g., a display, peripheral devices, etc.). Additionally, in some embodiments, one or more of the illustrative components may be incorporated in, or otherwise form a portion of, another component. The term "memory," as used herein in reference to performing similarity searches, may refer to the memory 104 and/or the data storage device 114, unless otherwise specified. As explained in more detail herein, media access circuitry 108, 118 (e.g., any circuitry or device configured to access and operate on data in the corresponding memory media 110, 120) connected a corresponding memory media 110, 120 (e.g., any device or material that data is written to and read from) may access (e.g., read) individual columns (e.g., bits) of vectors for use in performing similarity searches, also referred to as "stochastic associative searches" (SAS). As such, the memory operates as a "stochastic associative memory" (e.g., is designed to enable the efficient performance of stochastic associative searches). As explained in more detail, in performing a stochastic associative search, the compute device 100 converts data vectors to binary hash codes, determines Hamming distances between a given binary hash code (e.g., a key to searched) and clusters (i.e., groups) of binary hash codes (e.g., as represented by a single representative binary hash code, such as a centroid, of each cluster), and searches the binary hash codes within the closest cluster(s) (e.g., one or more clusters having the smallest Hamming distance), rather than searching through all of the binary hash codes in the memory (e.g., database). Furthermore, the compute device 100 continually manages the addition and removal (e.g., deletion) of data from the database, including adding or removing data from existing clusters, creating new clusters (e.g., to maintain a target cluster size), and eliminating empty clusters, without requiring the entire database to be rebuilt (e.g., reindexed).

The memory media 110, in the illustrative embodiment, has a three dimensional cross point architecture that has data access characteristics that differ from other memory architectures (e.g., dynamic random access memory (DRAM)), such as enabling access to one bit per tile and incurring time delays between reads or writes to the same partition or other partitions. The media access circuitry 108 is configured to make efficient use (e.g., in terms of power usage and speed) of the architecture of the memory media 110, such as by accessing multiple tiles in parallel within a given partition. In some embodiments, the media access circuitry 108 may utilize scratch pads (e.g., relatively small, low latency memory) to temporarily retain and operate on data read from the memory media 110 and broadcast data read from one partition to other portions of the memory 104 to enable calculations (e.g., matrix operations) to be performed in parallel within the memory 104. Additionally, in the illustrative embodiment, instead of sending read or write requests to the memory 104 to access matrix data, the processor 102 may send a higher-level request (e.g., a request for a macro operation, such as a request to return a set of N search results based on a search key). As such, many compute operations, such as artificial intelligence operations (e.g., stochastic associative searches) can be performed in memory (e.g., in the memory 104 or in the data storage device 114), with minimal usage of the bus (e.g., the I/O subsystem 112) to transfer data between components of the compute device 100 (e.g., between the memory 104 or data storage device 114 and the processor 102).

In some embodiments the media access circuitry 108 is included in the same die as the memory media 110. In other embodiments, the media access circuitry 108 is on a separate die but in the same package as the memory media 110. In yet other embodiments, the media access circuitry 108 is in a separate die and separate package but on the same dual in-line memory module (DIMM) or board as the memory media 110.

The processor 102 may be embodied as any device or circuitry (e.g., a multi-core processor(s), a microcontroller, or other processor or processing/controlling circuit) capable of performing operations described herein, such as executing an application (e.g., an artificial intelligence related application that may utilize stochastic associative searches). In some embodiments, the processor 102 may be embodied as, include, or be coupled to a field-programmable gate array (FPGA), an application specific integrated circuit (ASIC), reconfigurable hardware or hardware circuitry, or other specialized hardware to facilitate performance of the functions described herein.

The memory 104, which may include a non-volatile memory (e.g., a far memory in a two-level memory scheme), includes the memory media 110 and the media access circuitry 108 (e.g., a device or circuitry, such as a processor, application specific integrated circuitry (ASIC), or other integrated circuitry constructed from complementary metal-oxide-semiconductors (CMOS) or other materials) underneath (e.g., at a lower location) and coupled to the memory media 110. The media access circuitry 108 is also connected to the memory controller 106, which may be embodied as any device or circuitry (e.g., a processor, a co-processor, dedicated circuitry, etc.) configured to selectively read from and/or write to the memory media 110 in response to corresponding requests (e.g., from the processor 102 which may be executing an artificial intelligence related application that relies on stochastic associative searches to recognize objects, make inferences, and/or perform related artificial intelligence operations). In some embodiments, the memory controller 106 may include a vector function unit (VFU) 130 which may be embodied as any device or circuitry (e.g., dedicated circuitry, reconfigurable circuitry, an application specific integrated circuit (ASIC), a field programmable gate array (FPGA), etc.) capable of offloading vector-based tasks from the processor 102 (e.g., comparing data read from specific columns of vectors stored in the memory media 110, determining Hamming distances between the vectors (e.g., binary hash codes) stored in the memory media 110 and a search key, sorting the vectors according to their Hamming distances, etc.).

Figure 2:
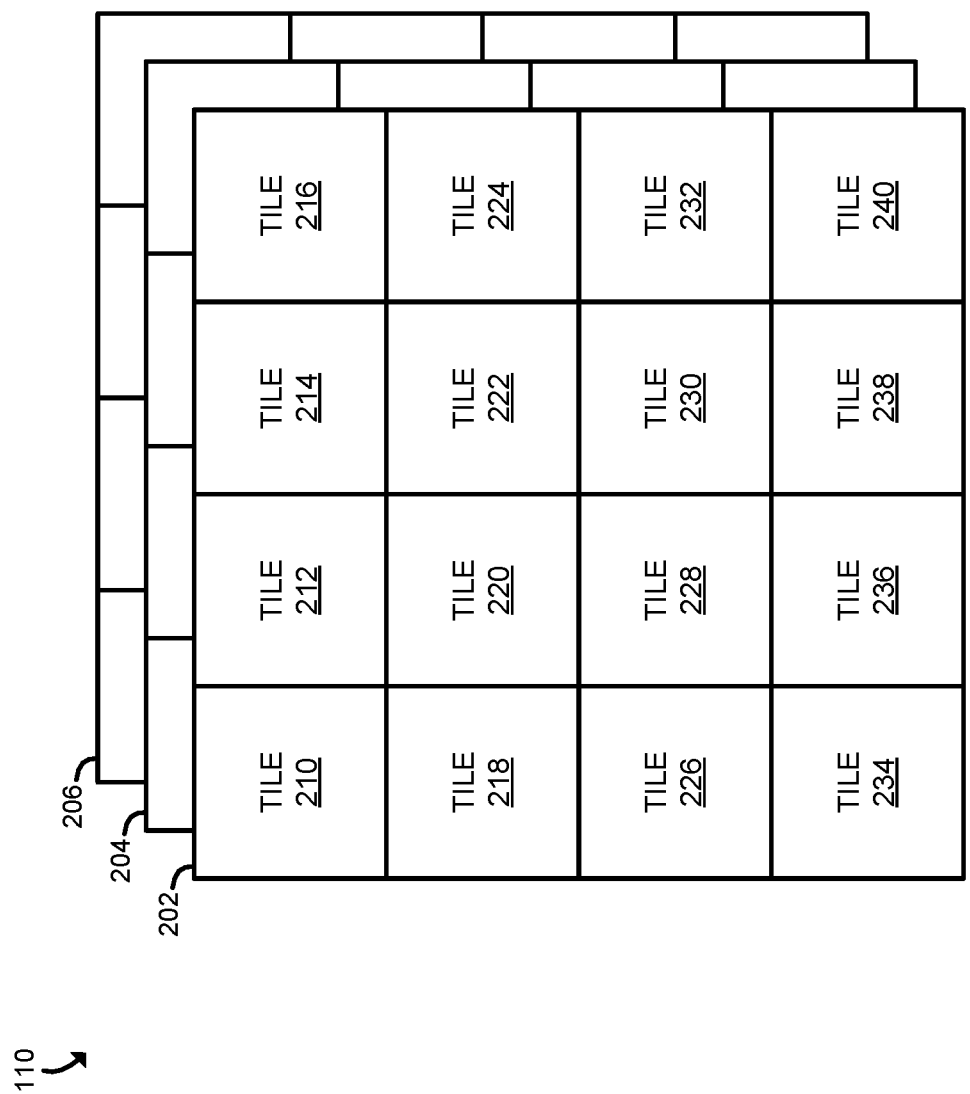
FIG. 2 is a simplified diagram of at least one embodiment of a memory media included in the compute device of FIG. 1.

Referring briefly to FIG. 2, the memory media 110, in the illustrative embodiment, includes a tile architecture, also referred to herein as a cross point architecture (e.g., an architecture in which memory cells sit at the intersection of word lines and bit lines and are individually addressable and in which bit storage is based on a change in bulk resistance), in which each memory cell (e.g., tile) 210, 212, 214, 216, 218, 220, 222, 224, 226, 228, 230, 232, 234, 236, 238, 240 is addressable by an x parameter and a y parameter (e.g., a column and a row). The memory media 110 includes multiple partitions, each of which includes the tile architecture. The partitions may be stacked as layers 202, 204, 206 to form a three dimensional cross point architecture (e.g., Intel 3D XPoint™ memory). Unlike typical memory devices, in which only fixed-size multiple-bit data structures (e.g., byte, words, etc.) are addressable, the media access circuitry 108 is configured to read individual bits, or other units of data, from the memory media 110 at the request of the memory controller 106, which may produce the request in response to receiving a corresponding request from the processor 102.

Referring back to FIG. 1, the memory 104 may include non-volatile memory and volatile memory. The non-volatile memory may be embodied as any type of data storage capable of storing data in a persistent manner (even if power is interrupted to the non-volatile memory). For example, the non-volatile memory may be embodied as one or more non-volatile memory devices. The non-volatile memory devices may include one or more memory devices configured in a cross point architecture that enables bit-level addressability (e.g., the ability to read from and/or write to individual bits of data, rather than bytes or other larger units of data), and are illustratively embodied as three dimensional (3D) cross point memory. In some embodiments, the non-volatile memory may additionally include other types of memory, including any combination of memory devices that use chalcogenide phase change material (e.g., chalcogenide glass), ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables bit-level addressability, similar to the architecture described above.

The processor 102 and the memory 104 are communicatively coupled to other components of the compute device 100 via the I/O subsystem 112, which may be embodied as circuitry and/or components to facilitate input/output operations with the processor 102 and/or the main memory 104 and other components of the compute device 100. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the processor 102, the main memory 104, and other components of the compute device 100, in a single chip.

The data storage device 114 may be embodied as any type of device configured for short-term or long-term storage of data such as, for example, memory devices and circuits, memory cards, hard disk drives, solid-state drives, or other data storage device. In the illustrative embodiment, the data storage device 114 includes a memory controller 116, similar to the memory controller 106, memory media 120 (also referred to as "storage media"), similar to the memory media 110, and media access circuitry 118, similar to the media access circuitry 108. Further, the memory controller 116 may also include a vector function unit (VFU) 132 similar to the vector function unit (VFU) 130. The data storage device 114 may include a system partition that stores data and firmware code for the data storage device 114 and one or more operating system partitions that store data files and executables for operating systems.

The communication circuitry 122 may be embodied as any communication circuit, device, or collection thereof, capable of enabling communications over a network between the compute device 100 and another device. The communication circuitry 122 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 122 includes a network interface controller (NIC) 124, which may also be referred to as a host fabric interface (HFI). The NIC 124 may be embodied as one or more add-in-boards, daughter cards, network interface cards, controller chips, chipsets, or other devices that may be used by the compute device 100 to connect with another compute device. In some embodiments, the NIC 124 may be embodied as part of a system-on-a-chip (SoC) that includes one or more processors, or included on a multichip package that also contains one or more processors. In some embodiments, the NIC 124 may include a local processor (not shown) and/or a local memory (not shown) that are both local to the NIC 124. In such embodiments, the local processor of the NIC 124 may be capable of performing one or more of the functions of the processor 102. Additionally or alternatively, in such embodiments, the local memory of the NIC 124 may be integrated into one or more components of the compute device 100 at the board level, socket level, chip level, and/or other levels. The one or more accelerator devices 126 may be embodied as any device(s) or circuitry capable of performing a set of operations faster than the general purpose processor 102. For example, the accelerator device(s) 126 may include a graphics processing unit 128, which may be embodied as any device or circuitry (e.g., a co-processor, an ASIC, reconfigurable circuitry, etc.) capable of performing graphics operations (e.g., matrix operations) faster than the processor 102.

Figure 3:
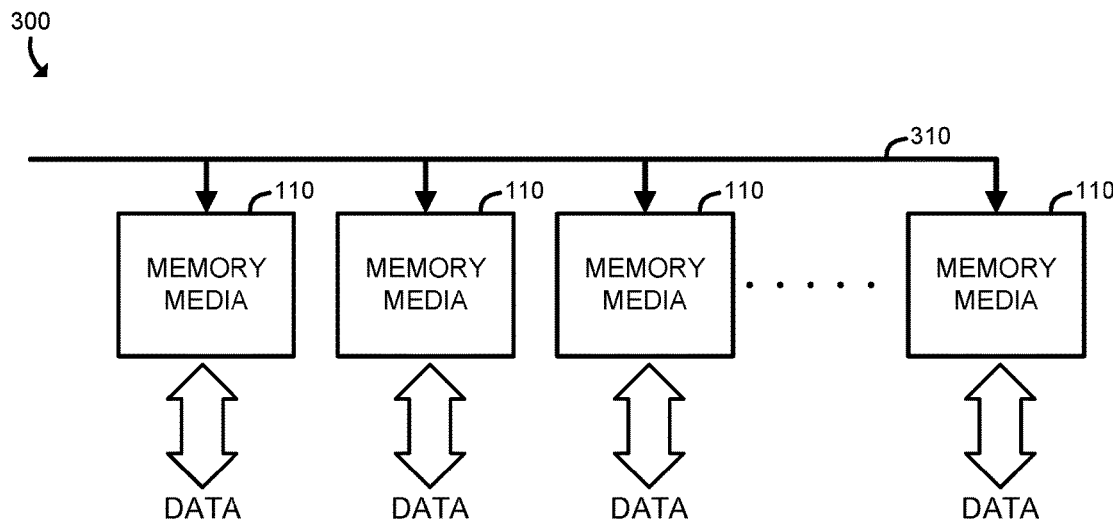
FIG. 3 is a simplified diagram of at least on embodiment of the memory media of the compute device of FIG. 1 in a dual in-line memory module (DIMM)

Referring now to FIG. 3, the compute device 100, in some embodiments, may utilize a dual in-line memory module (DIMM) architecture 300. In the architecture 300, multiple dies of the memory media 110 are connected with a shared command address bus 310. As such, in operation, data is read out in parallel across all of the memory media 110 connected to the shared command address bus 310. Data may be laid out across the memory media 110 in a configuration to allow reading the same column across all of the connected dies of the memory media 110.

Figure 4:
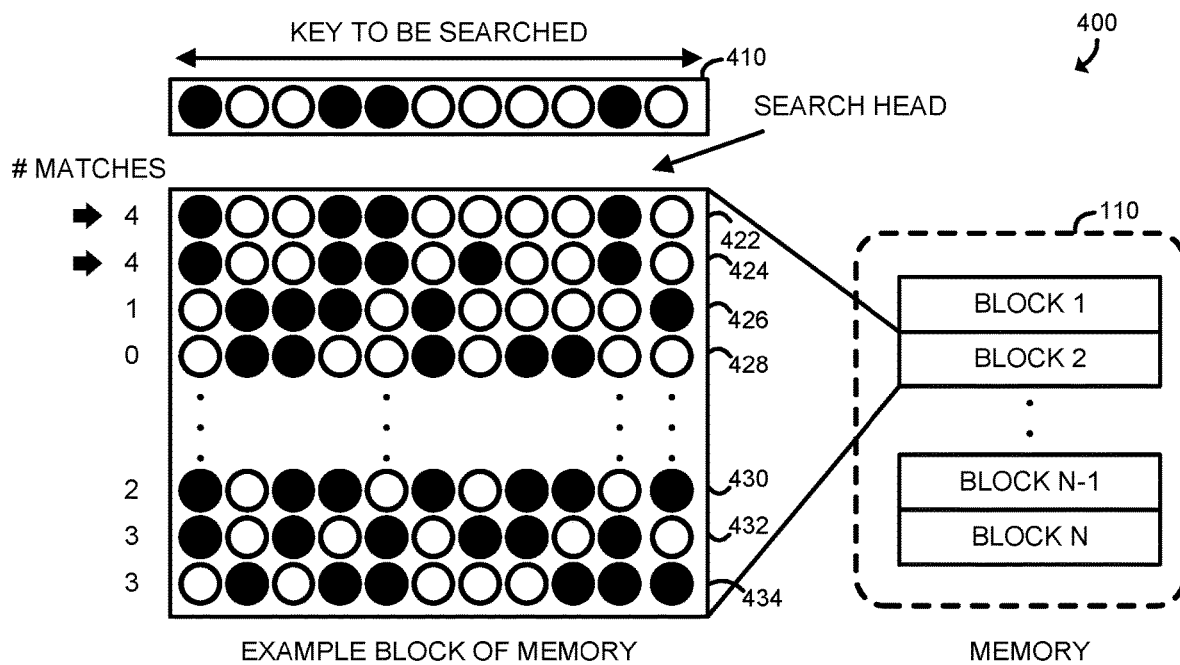
FIG. 4 is a simplified diagram of a stochastic associative search (SAS) performed using a binary search key on the memory media of FIGS. 1-3.

Referring now to FIG. 4, the compute device 100 may perform a stochastic associative search 400, which is a highly efficient and fast way of searching through a large database of records and finding similar records to a given query record (key). For simplicity and clarity, the stochastic associative search 400 and other processes are described herein as being performed with the memory 104. However, it should be understood that the processes could alternatively or additionally be performed with the storage device 114, depending on the particular embodiment. Given that the memory media 110 allows both row and column-wise reads with similar read latency, the memory media 110 is particularly suited to enabling efficient stochastic associative searches. As described in more detail herein, to utilize the characteristics of the memory media 110 to perform efficient (e.g., accelerated, using less power and time than would otherwise be consumed) stochastic associative searches, the compute device 100 writes database elements (e.g., records, vectors, rows, etc.) to the memory media 110 in binary format (e.g., ones and zeros) as hash codes (e.g., sequences of values produced by a hashing function), that are sparse (e.g., have more zeros than ones). Subsequently, in performing a search, individual binary values of the search key 410 are compared to the corresponding binary values in the database elements (e.g., vectors) 422, 424, 426, 428, 430, 432, 434 stored in the blocks of the memory media 110. The compute device 100 determines the number of matching binary values between the search key 410 and each database element (e.g., vector), which is representative of a Hamming distance between the search key 410 and each database element (e.g., vector). The database elements (e.g., vectors) having the greatest number of matches (e.g., lowest Hamming distance) are the most similar results (e.g., the result set) for the stochastic associative search 400. As described in more detail herein, rather than searching the entire database for the closest results to a given search key 410, in some embodiments, the compute device 100 may initially identify a cluster of database elements that has the smallest Hamming distance from the search key 410 and search only within that closest cluster, thereby avoiding the time and energy that would otherwise be expended in searching through the entire database (e.g., calculating Hamming distances between the search key 410 and every vector (e.g., binary hash code) in the database). Furthermore, and as described in more detail herein, the compute device 100 adds and/or removes data from the clusters on an ongoing basis (e.g., as needed) without rebuilding (e.g., reindexing) the entire database.

Example flows of operations may proceed as follows depending on the particular embodiment (e.g. whether the vector function unit 130 is present). The elements are stored in the memory media 110 as binary vectors using row write operations. For a given stochastic associative search, the compute device 100 formats a search query using a hash encoding that matches the hash encoding used to produce the binary format of the vectors in the database. In at least some embodiments in which the VFU 130 is not present, the processor 102 sends a block column read request to the memory controller 106 to read specified columns (e.g., the columns corresponding to the set bits (bits having a value of one) in search key 410). The processor 102 subsequently ranks the top matching rows (e.g., vectors) based on the number of set bits matching for the column data that was read. The processor 102 subsequently identifies the top N similar rows for the application requesting the search results. As described in more detail herein, in at least some embodiments, the compute device 100 may identify a closest cluster of vectors (e.g., binary hash codes) and search only within that closest cluster, rather than searching the entire database. In at least some embodiments in which the VFU 130 is present, the process may proceed as follows. The processor 102 may send an instruction to the memory controller 106 to perform a macro operation (e.g., return top N results based on a given search key 410). Subsequently, the memory controller 106 sends a block column read request to the media access circuitry 108 to read, from the memory media 110, the columns corresponding to the set bits in the search key 410. The VFU 130 in the memory controller 106 subsequently ranks and sorts the top N matching rows (e.g., vectors) based on the number of set bits matching the column data that was read, and the memory controller 106 subsequently sends, to the processor 102, data indicative of the top N matching rows (e.g., vectors) as the search results. In some embodiments, the VFU 130 may identify the closest cluster of vectors and rank and sort only the vectors within that closest cluster, rather than operating on all of the vectors in the database.

Figure 5:
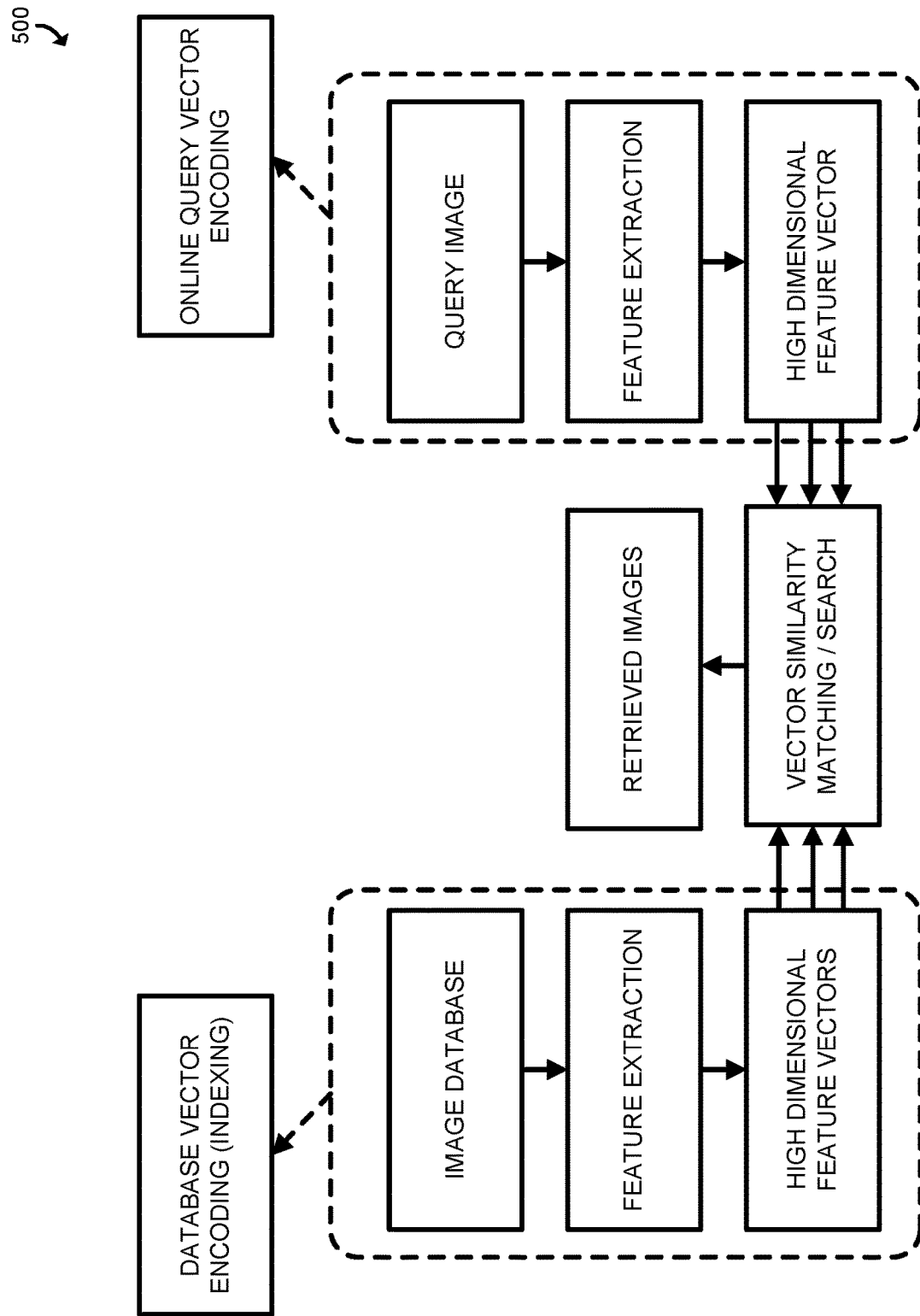
FIG. 5 is a simplified diagram of at least one embodiment of a content-based image retrieval (CBIR) system that may be implemented using the compute device of FIG. 1.
Figure 6:
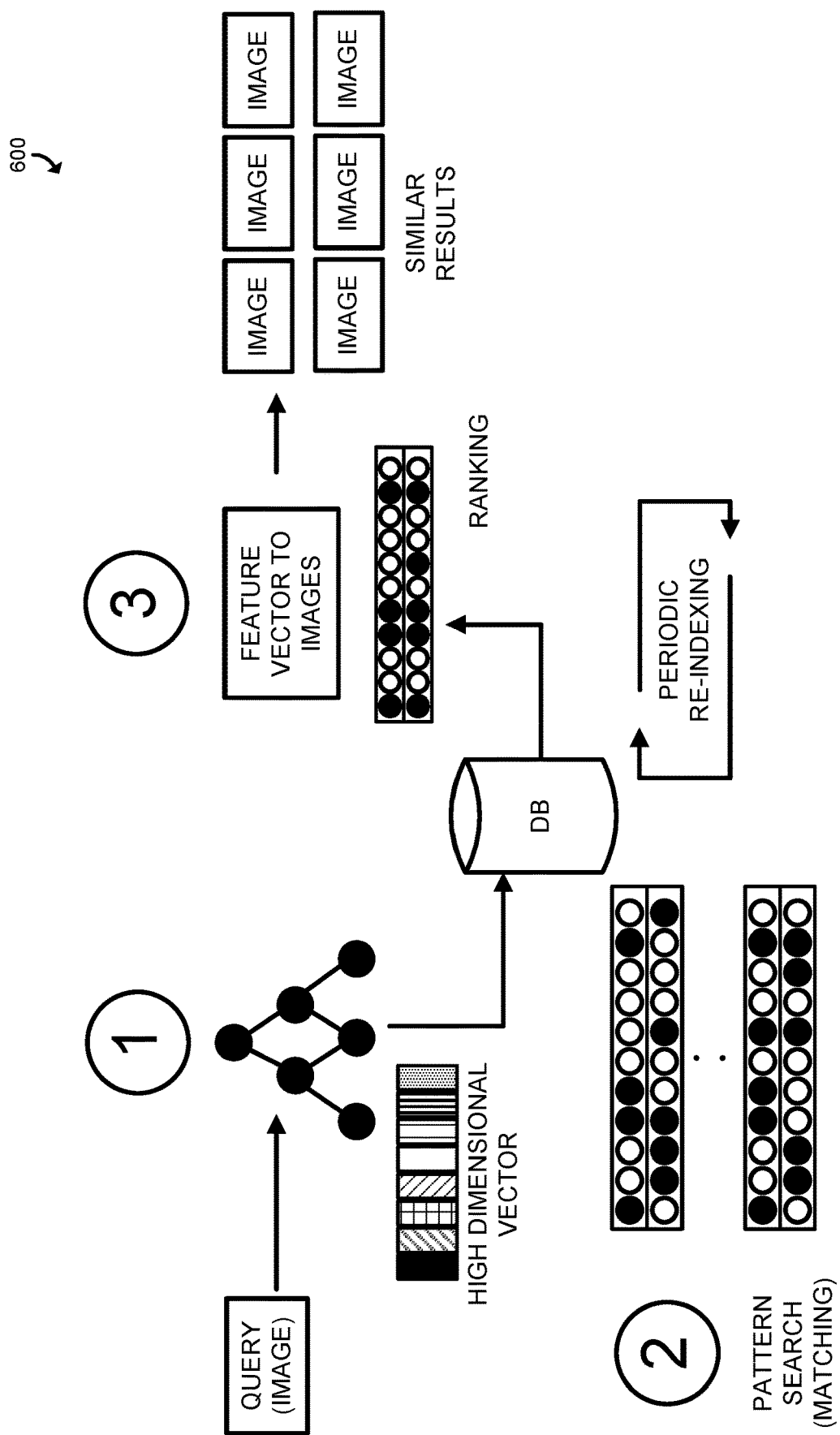
FIG. 6 is a simplified diagram of a deep learning-based similarity search workflow for the CBIR system of FIG. 5.

Referring now to FIG. 5, a content-based image retrieval system 500 may be implemented with the compute device 100. Given a database of high-dimensional vectors and a query vector q (e.g., the search key 410 of FIG. 4) of the same dimensions, the content-based image retrieval (CBIR) system 500 searches for database vectors (e.g., the vectors 422, 424, 426, 428, 430, 432, 434 of FIG. 4) that are similar or closer to q than others, based on a similarity function (e.g., a function that determines a distance between the query vector and each database vector). For example, the content-based image retrieval system 500 identifies similar images in a database using a query image. A feature extraction step may involve a deep learning model or other type of process, such as a human-designed algorithm. FIG. 6 illustrates a deep learning-based similarity search workflow 600 for the CBIR system 500, where the vectors represent the extracted features from the content of images. In other embodiments, the vectors may represent the content of other objects (e.g., sounds, video, bioinformatics data, etc.) extracted and summarized (e.g., via deep learning or another process). In the illustrative embodiment, the present compute device 100, in operation, implements a content-based similarity search system (e.g., the system 500) that significantly improves the runtime performance (e.g., speed, power usage, etc.) and accuracy of a search. In particular, the compute device 100 operates on modern, large-scale (e.g., order of billions), complex, and high-dimensional datasets, utilizing the unique features of the memory media 110 (e.g., column and row addressability).

Figure 7:
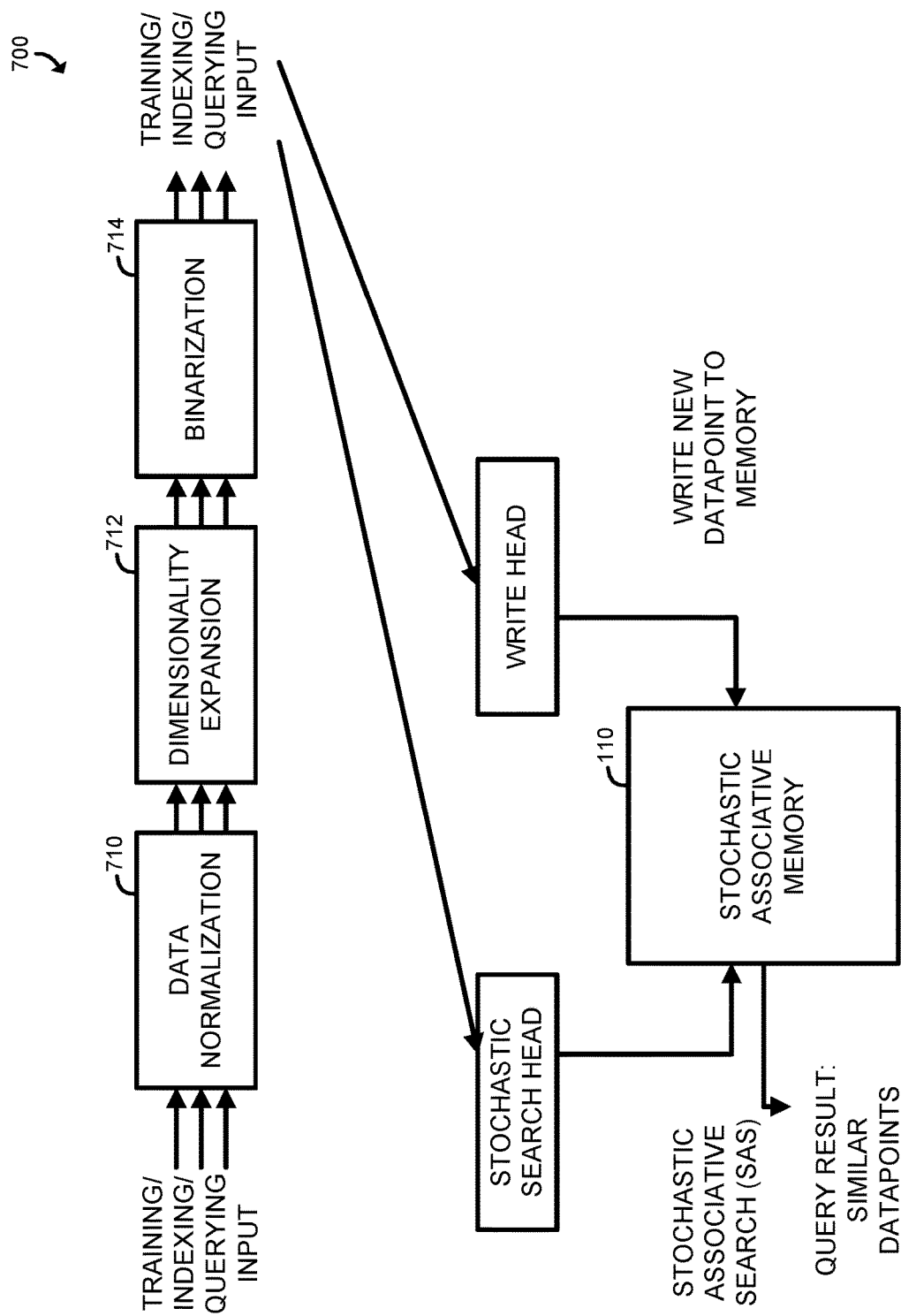
FIG. 7 is a diagram of a random sparse lifting (RSL) data and control flow similarity search pipeline that may be implemented using the memory media of the compute device of FIG. 1.
Figure 8:
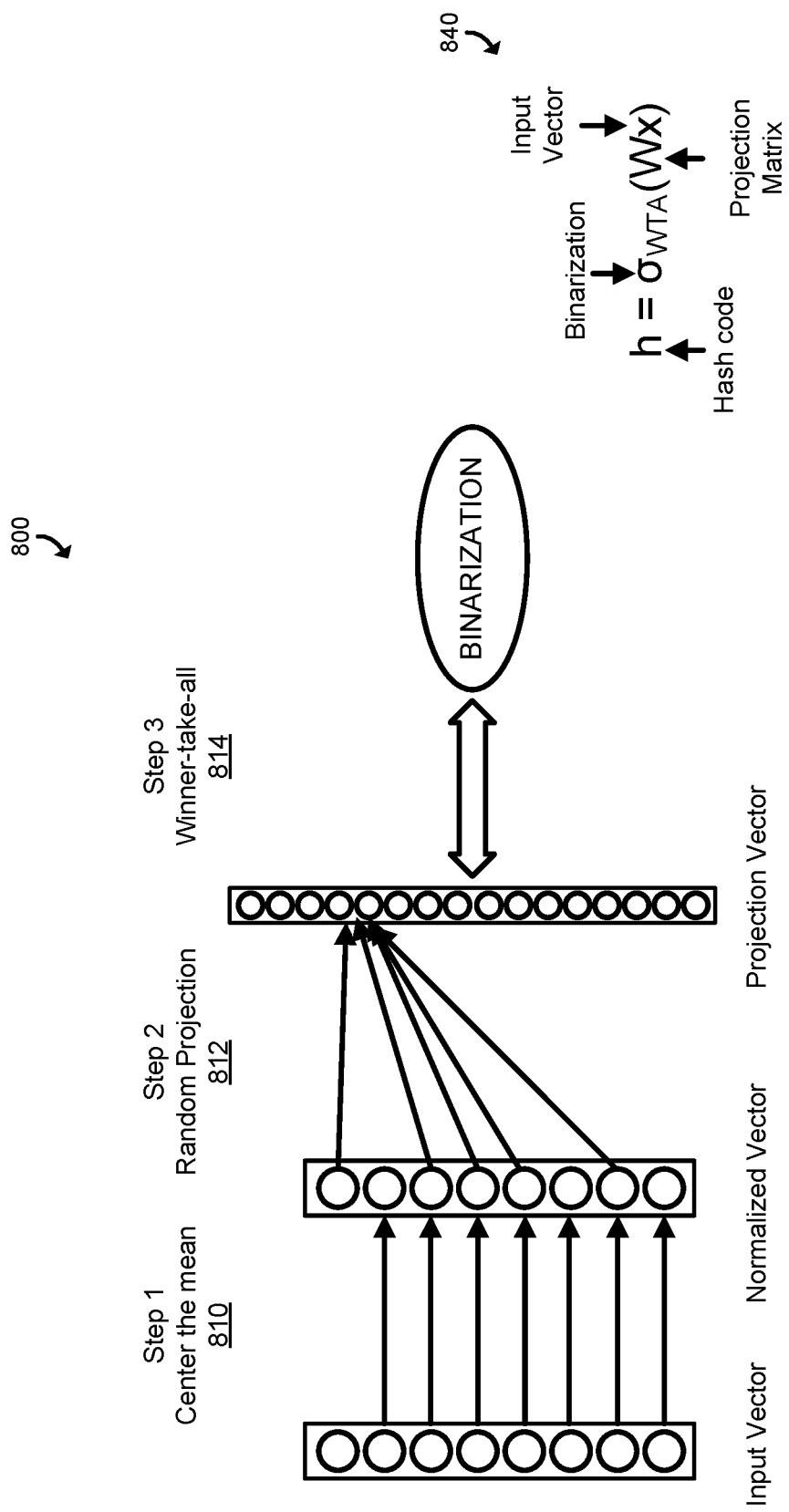
FIG. 8 is a diagram of an algorithmic pipeline for random sparse lifting (RSL) and a mathematical equation for performing RSL that may be implemented using the compute device of FIG. 1.

Referring now to FIG. 7, the compute device 100 may implement a random sparse lifting (RSL) data and control flow similarity search pipeline 700 using the memory media 110. Also referring to FIG. 8, an algorithmic pipeline 800 which may be utilized by the compute device 100 for performing random sparse lifting (RSL) and a mathematical equation 840 for performing RSL are shown. In random sparse lifting, the compute device 100 takes an input vector x (e.g., a d-dimensional floating point vector) and operates in the following three steps, as illustrated in FIGS. 7 and 8, in a manner similar to the olfactory system of the *Drosophila melanogaster* (the fruit fly). In one step 710, 810, the compute device 100 performs data normalization. In doing so, the compute device 100 normalizes input data to add invariance to specific deformations (e.g., translations, rotations, sheer stress, etc.). For example, the compute device 100 may determine the mean of the values in input data (e.g., in an input data vector) and remove (e.g., subtract) the mean from the values. In a subsequent step 720, 820, the compute device 100 performs dimensionality expansion. In doing so, the compute device 100 projects the normalized input data to a higher dimensional space, having dimensionality D, where D is greater than d (e.g., 20 to 40 fold increase in dimensionality). The projection ensures that each element in the higher-dimensional projection vector receives and sums relatively few elements from the input vector, as shown in FIG. 8. The procedure can be formalized as matrix multiplication of input vector x and a binary sparse projection matrix (or dense floating point matrix) W of dimension (Dxd). The compute device 100 stores the sparse (or dense) projection matrix W (also referred to as the model parameter) in memory (e.g., the memory 104) to be used for subsequent queries. In a subsequent step 730, 830, the compute device 100 binarizes the projection vector to produce a hash code using a winner-take-all (WTA) strategy in which only a small fraction of top entries (e.g., largest values) in the projection vector (e.g., 5% of D) are set to one and the rest are set to zero. The RSL procedure efficiently leverages the unique features of the memory media (e.g., the ability to read individual columns) to accelerate a similarity search on a large scale database (e.g., order of a billion elements) without losing the accuracy of the results. Specifically, the algorithm generates sparse binary hash codes and is a distance preserving transformation from input to Hamming space. Further, the sparse binary hash code reduces the number of memory read operations that would otherwise be required because of the relatively few ones compared to zeros in the hash code, and information is contained only in the set bits (e.g., the bits set to one) in the binary hash code. As such, the binary hash code satisfies all of the requirements of the stochastic associative search and can benefit from in-memory binary search acceleration provided by the memory 104.

Figure 9:
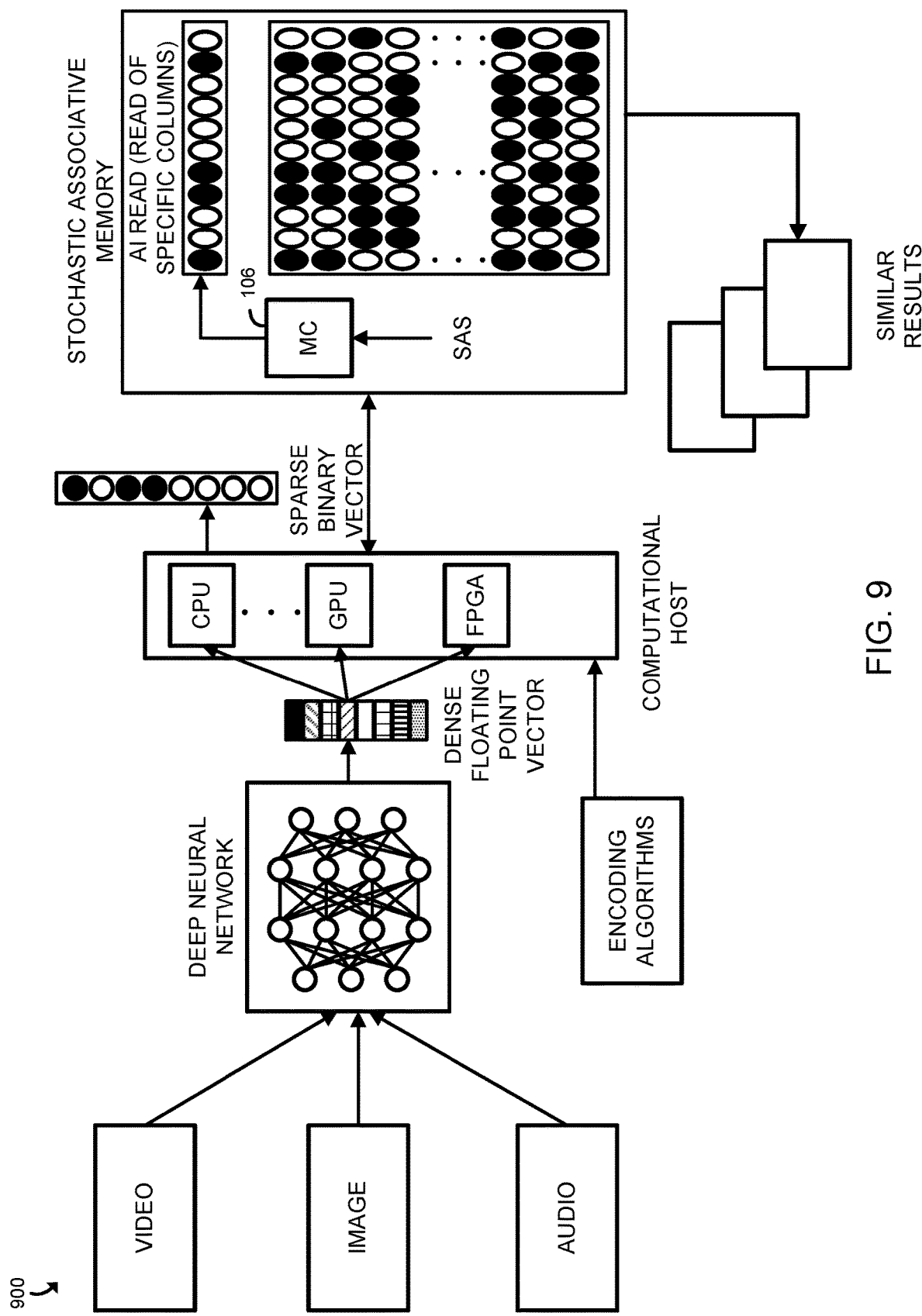
FIG. 9 is a diagram of a hardware mapping of stages of the RSL pipeline of FIG. 8.

Referring now to FIG. 9, at least one embodiment of a hardware mapping 900 of the stages of an RSL pipeline (similar to the pipeline 700) is shown. During training, a random sparse (or dense) projection matrix W is generated using which the input data set is transformed from floating point vectors to high-dimensional sparse binary hash codes. As shown in FIG. 8, the transformation is performed by a computational host (e.g., a central processing unit (CPU), a graphics processing unit (GPU), a field programmable gate array (FPGA), or other circuitry). Subsequently, the hash codes and the projection matrix W are stored in a stochastic associative memory (e.g., the memory media 110). The same sparse projection matrix W is also used during indexing to generate binary hash codes for new elements added to the database. Query processing involves retrieving the stored matrix W and performing the above three steps to generate the sparse binary code to be used for searching (e.g., the search key 410 of FIG. 4). The compute device 100 compares the query hash code (e.g., the search key 410) with the database hash codes (e.g., the vectors 422, 424, 426, 428, 430, 432, 434) and calculates the pair-wise Hamming distances (e.g., based on the matching bits, as described above). The comparison, in the illustrative embodiment, is performed in the memory (e.g., in the memory 104). Further, in the illustrative embodiment, the memory 104 (e.g., the memory controller 106) at least partially sorts the database elements (e.g., the vectors 422, 424, 426, 428, 430, 432, 434) based on the Hamming distances and returns the indices of the closest matching vectors 422, 424, 426, 428, 430, 432, 434 (e.g., the closest matching N vectors). In some embodiments, rather using a projection matrix of random, sparse binary values, the compute device 100 instead utilizes (e.g., performs dimensionality expansion with) a projection matrix of values (e.g., dense, floating point values) that have been adapted to (e.g., optimized) the type of data being searched, using machine learning.

Figure 10:
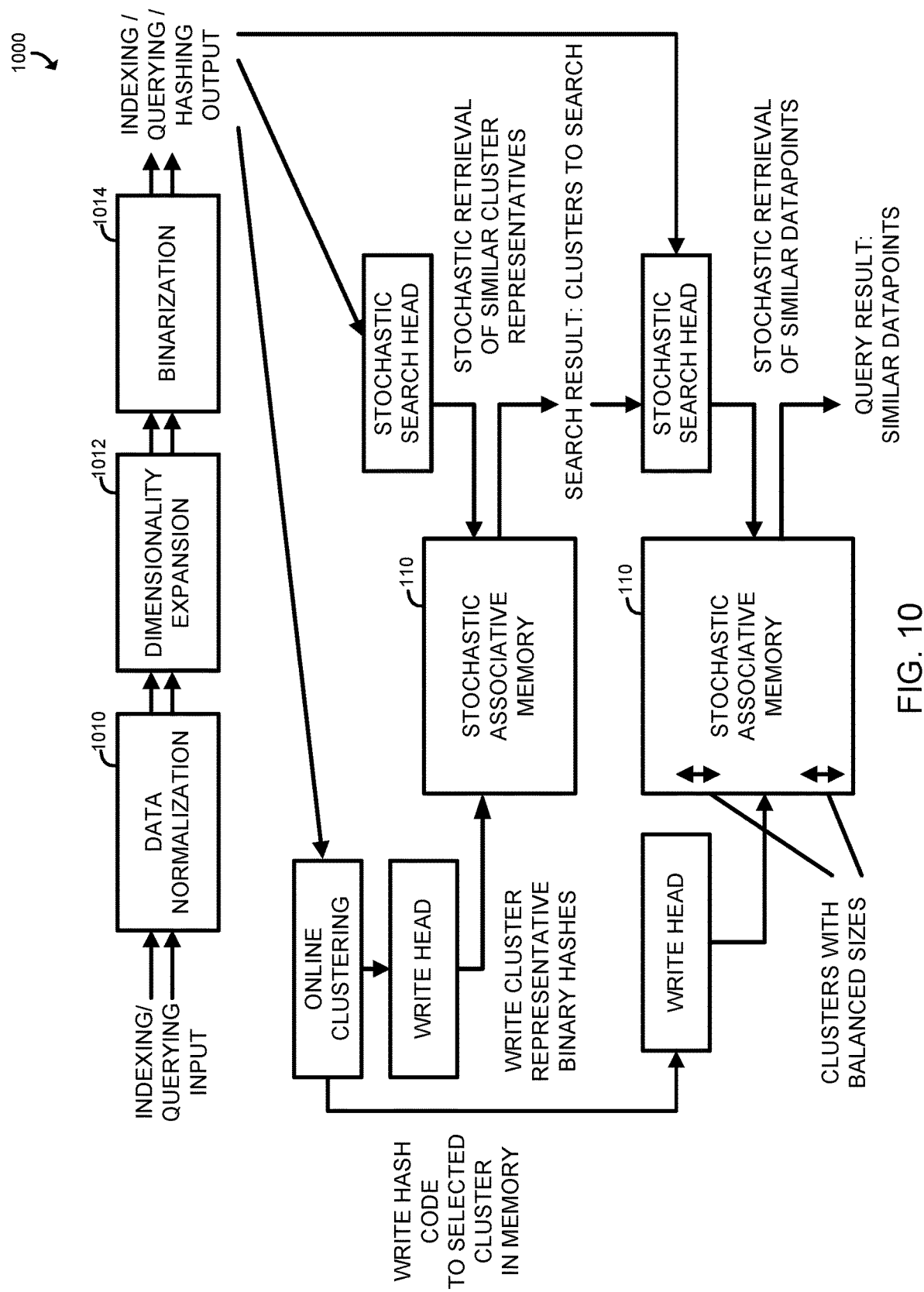
FIG. 10 is a diagram of a flow that may be utilized by the compute device of FIG. 1 to utilize clusters in a stochastic similarity search system.

Referring now to FIG. 10, in some embodiments, the compute device 100 may implement a pipeline 1000 similar to the pipeline 700 (FIG. 7) in which the compute device 100 utilizes clusters in a stochastic similarity search system. Specifically, the compute device 100 performs stochastic associative search operations associated with data normalization 1010, dimensionality expansion 1012, and binarization 1014, similar to the operations 710, 712, and 714 of the pipeline 700. In the pipeline 1000, the compute device 100 writes representative binary hashes (e.g., sparse binary vectors) that are each representative of a corresponding cluster of binary hashes (e.g., are the centroid of the corresponding cluster) to the stochastic associative memory 110 (e.g., in one data set) and also maintains all of the binary hashes of all of the clusters in the stochastic associative memory 110 (e.g., in another data set). When performing a similarity search, the compute device 100 first identifies the closest cluster(s) of binary hashes to a given search key (e.g., binary hash), by determining the Hamming distance of the representative binary hash of each cluster to the search key, and then searches within the closest cluster(s) for the binary hashes having the lowest Hamming distance from the search key. Furthermore, the compute device 100 continually adds data to clusters, removes data from clusters, creates new clusters, and eliminates clusters on an ongoing basis without rebuilding the entire database. Illustrative embodiments of methods for adding data and removing data from the memory (e.g., the stochastic associative memory 110) are set forth in FIGS. 11 and 12.

Figure 11:
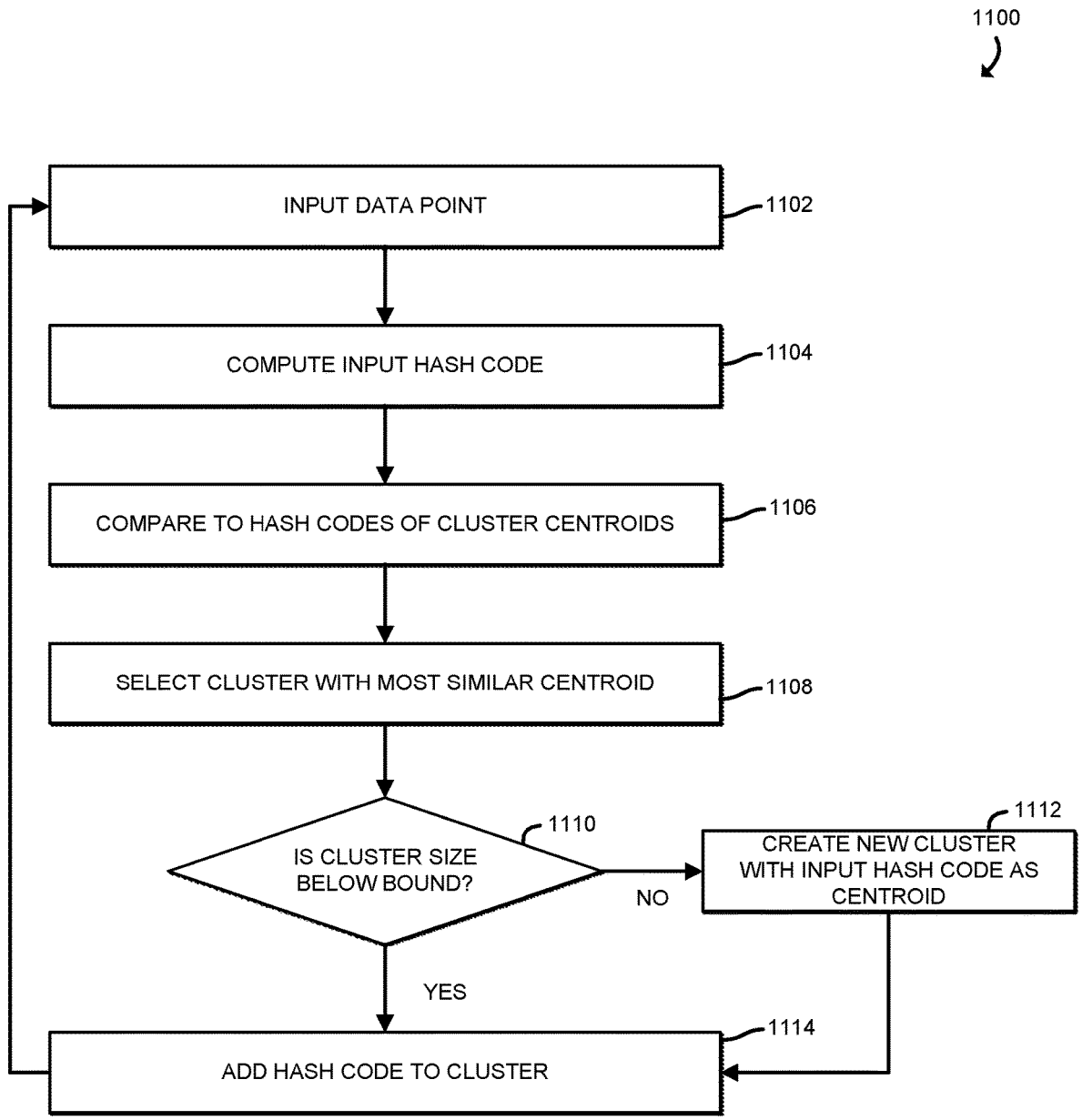
FIG. 11 is a flow diagram of a method for adding data to a stochastic associative search system using clusters that may be implemented by the compute device of FIG. 1.

Referring now to FIG. 11, a method 1100 for adding data to a stochastic associative search system using clusters, in the illustrative embodiment, begins with block 1102, in which the compute device 100 obtains an input data point (e.g., a vector of data representative content of an object (e.g., sound, video, bioinformatics data, etc.) that has been extracted and summarized (e.g., via deep learning or another process)). Subsequently, in block 1104, the compute device 100 computes an input hash code from the data point (e.g., using the normalization 710, 1010, the dimensionality expansion 712, 1012, and the binarization 714, 1014 operations). In block 1106, the compute device 100 compares the computed hash code from block 1104 to hash codes of cluster centroids (e.g., determining Hamming distances). Afterwards, the compute device 100 selects the cluster with the most similar centroid (e.g., having the smallest Hamming distance from the computed hash code), as indicated in block 1108. In block 1110, the compute device 100 determines whether the selected cluster (e.g., from block 1108) is below a predefined bound (e.g., size). If not, the method 1100 advances to block 1112, in which the compute device 100 creates a new cluster with the input hash code (e.g., calculated in block 1104) as the representative (e.g., centroid). Otherwise, or after creating the new cluster, the method 1100 advances to block 1114, in which the compute device 100 adds the computed hash code (e.g., from block 1104) to the cluster (e.g., the selected cluster from block 1108 or the newly created cluster from block 1112). Subsequently, the method 1100 loops back to block 1102 to potentially add another data point.

Figure 12:
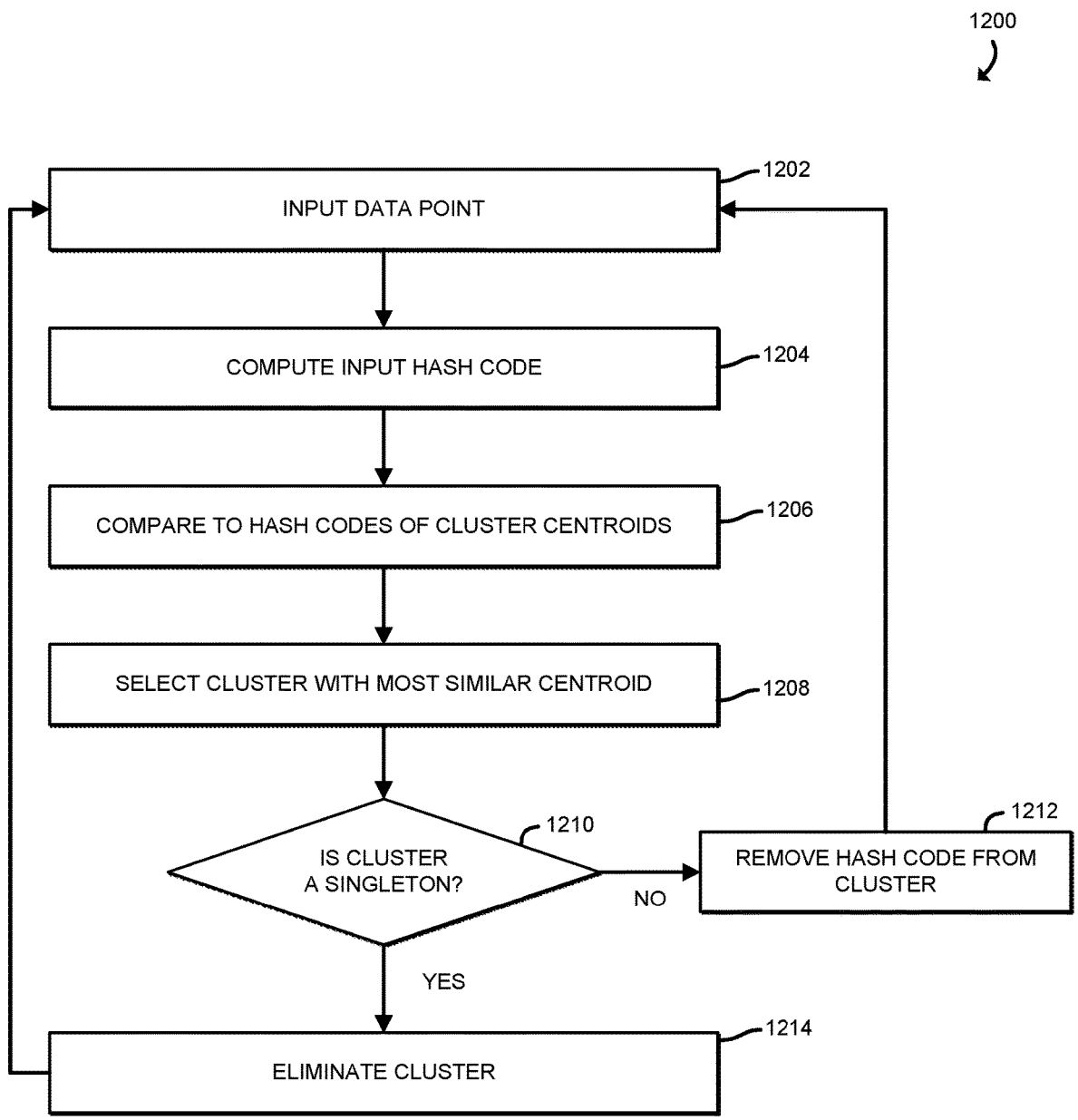
FIG. 12 is a flow diagram of a method for removing data from a stochastic associative search system using clusters that may be implemented by the compute device of FIG. 1.

Referring now to FIG. 12, a method 1200 for removing data from a stochastic associative search system using clusters, in the illustrative embodiment, begins with block 1202, in which the compute device 100 obtains an input data point (e.g., indicative of data to be searched for and removed from the memory). Subsequently, in block 1204, the compute device 100 computes an input hash code, similar to the operations described with reference to block 1104 of FIG. 11. Afterwards, in block 1206, the compute device 100 compares the computed hash code to hash codes of cluster centroids, similar to bock 1106 of FIG. 11. Subsequently, in block 1208, the compute device 100 selects the cluster with the most similar centroid, similar to block 1108 of FIG. 11. In block 1210, the compute device 100 determines whether the selected cluster is a singleton (e.g., whether the selected cluster contains only one element). If not, the method 1200 advances to block 1212, in which the compute device 100 removes the hash code from the selected cluster. In some instances, multiple hash codes in the cluster may have exactly the same hash code as the item to delete. In that case, the compute device 100 may delete the hash code having the same global index in the database. Doing so may require associating each inserted data point (e.g., hash code) with a unique identifier (e.g., a counter that is increased by one with each insertion). Otherwise, if the cluster is a singleton, the method 1200 advances to block 1214, in which the compute device 100 eliminates the cluster (e.g., removes the cluster from the memory). Afterwards, the method 1200 loops back to block 1202 to potentially remove other data from the memory.

Figure 13:
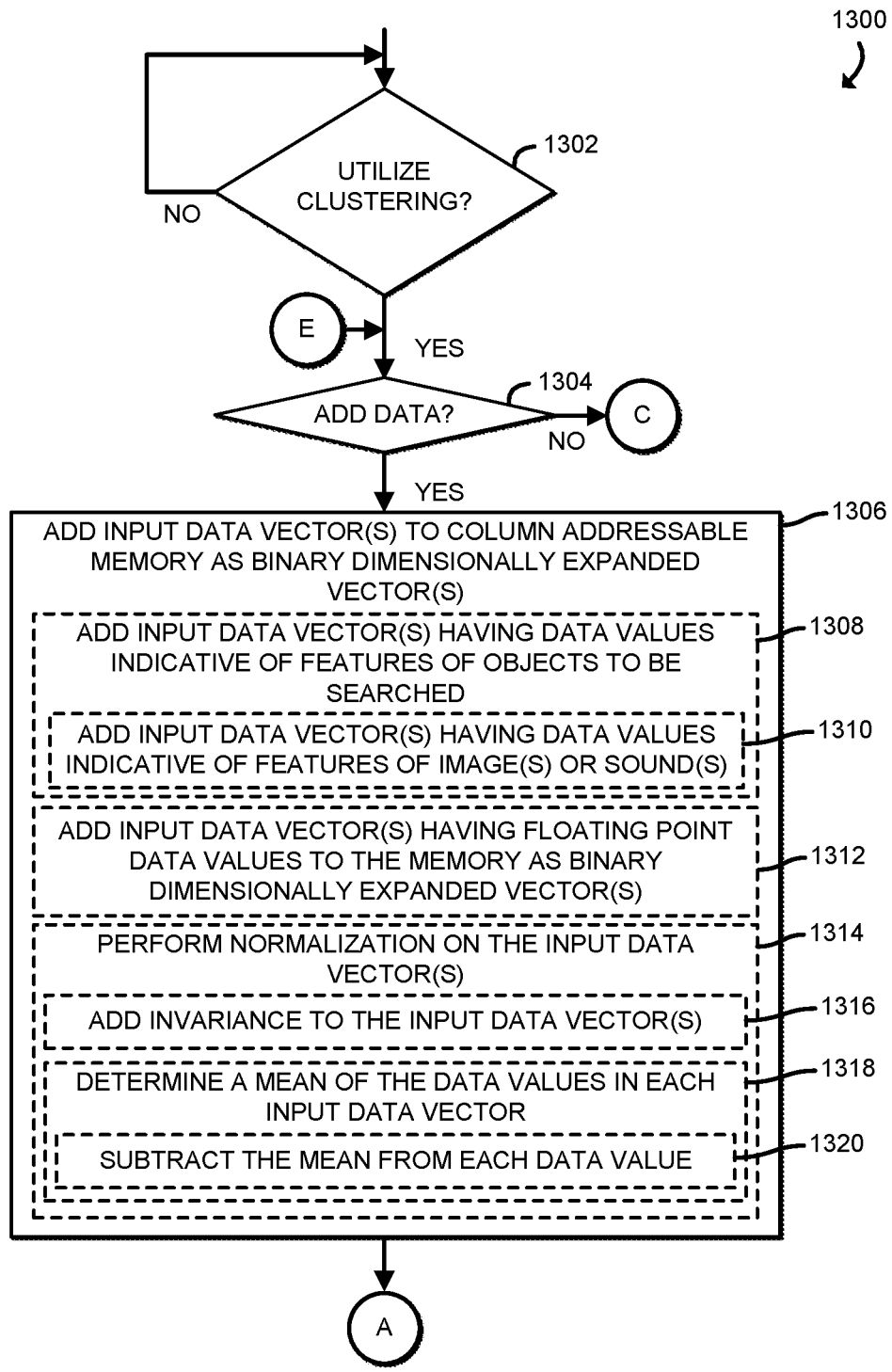
FIGS. 13-16 are flow diagrams of at least one embodiment of a method for performing stochastic similarity searches in an online clustering space that may be performed by the compute device of FIG. 1.

Referring now to FIG. 13, the compute device 100, in operation, may execute a method 1300 for performing stochastic similarity searches in an online clustering space (e.g., using clusters). The method 1300 begins with block 1302 in which the compute device 100 determines whether to utilize clustering in stochastic similarity searches. In doing so, the compute device 100 may determine to utilize clustering in response to a determination that a configuration setting (e.g., in a configuration file) indicates to enable clustering in similarity searches and/or based on other factors. Regardless, in response to a determination to enable clustering, the method 1300 advances to block 1304, in which the compute device 100 determines whether to add data (e.g., input data to be searched). The compute device 100 may determine to add data in response to a request from an application (e.g., executed by the processor 102) to add data to be searched, in response to a request from another compute device 100 (e.g., a request received via the communication circuitry 122) to add data, in response to a determination that a source for input data includes new data that has not yet been indexed (e.g., converted to binary dimensionally expanded vectors in the memory media 110 and added to a cluster) by the compute device 100 and/or based on other factors.

In response to a determination to add data, the method 1300 advances to block 1306, in which the compute device 100 adds one or more input data vectors to column addressable memory as binary dimensionally expanded vector(s) (e.g., one binary dimensionally expanded vector per input data vector). In doing so, and as indicated in block 1308, the compute device 100, in the illustrative embodiment, adds one or more input data vectors having data values that are indicative of features of objects to be searched (e.g., based on a feature extraction process). For example, and as indicated in block 1310, the compute device 100 may add one or more input data vectors having data values indicative of features of images or sounds. In other embodiments, the input data vectors may have data values indicative of other types of objects to be searched (e.g. videos, bioinformatics data such as genetic sequences, etc.). As indicated in block 1312, the compute device 100, in the illustrative embodiment, adds input data vector(s) having floating point data values to the memory (e.g., the memory media 110) as binary dimensionally expanded vectors. In the illustrative embodiment, the compute device 100 performs normalization on the input data vector(s), as indicated in block 1314. In doing so, the compute device 100 adds invariance to the input data vectors, as indicated in block 1316. In some embodiments, to normalize the input data vector(s), the compute device 100 determines a mean of the data values in the input data vector(s), as indicated in block 1318, and subtracts the mean from each data value, as indicated in block 1320. The normalization process is also shown as steps 710 in FIGS. 7 and 1010 in FIG. 10. Subsequently, the method 1300 advances to block 1322 of FIG. 14, in which the compute device 100, in the illustrative embodiment, performs dimensionality expansion on each input data vector.

Figure 14:
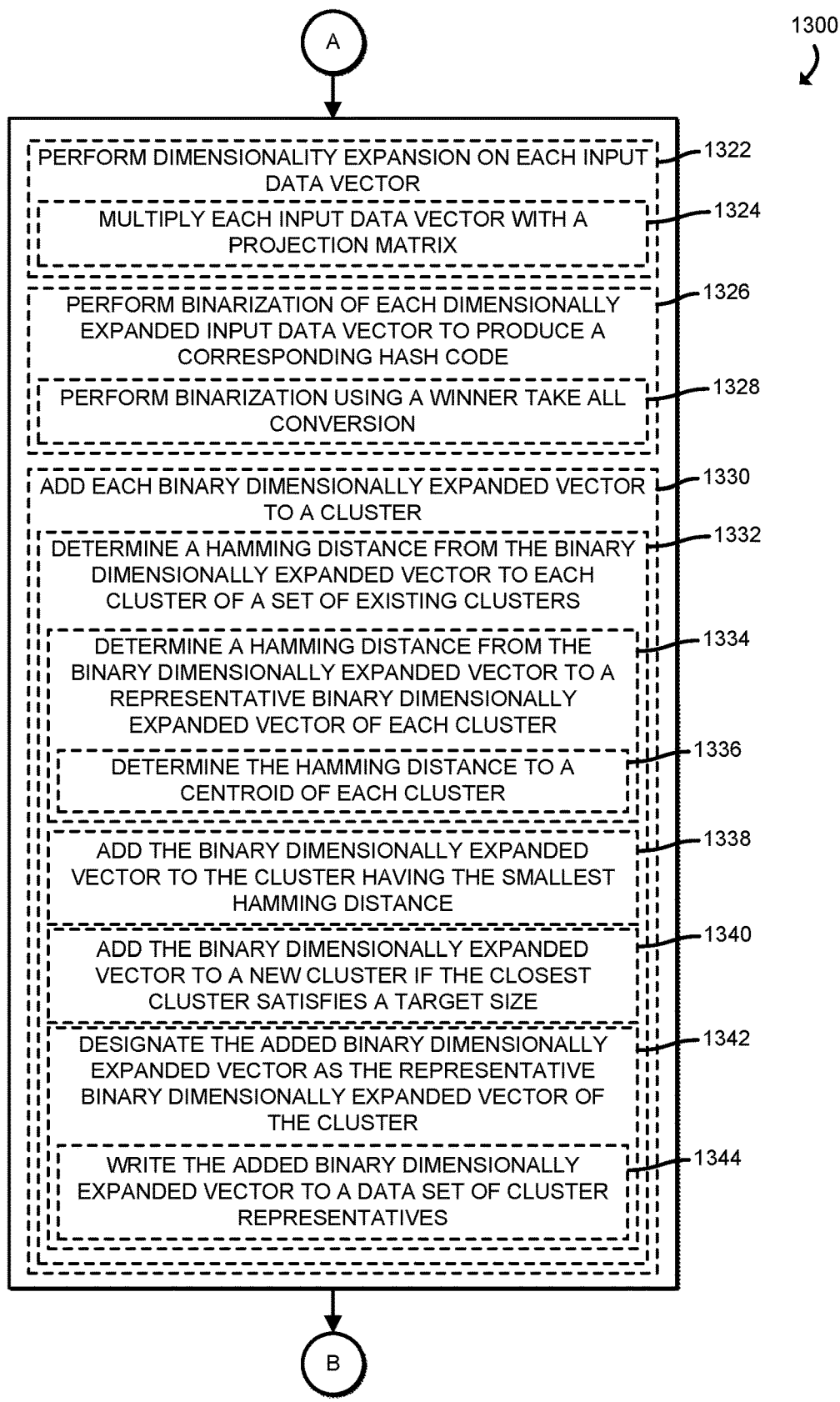

Referring now to FIG. 14, and as indicated in block 1324, in performing dimensionality expansion, the compute device 100 multiplies each input data vector with a projection matrix (e.g., the binary sparse (or dense floating point) projection matrix W). In doing so, the compute device 100 may multiply each input data vector with a binary sparse (or dense floating point) projection matrix (W) of random binary values (e.g., random sparse lifting). The dimensionality expansion using a binary sparse projection matrix of random binary values is also represented in step 712 of FIG. 7. Alternatively, in other embodiments, the compute device 100 may multiply each input data vector with a projection matrix (W) (e.g., a dense floating point matrix) adapted to the input data vectors, to provide more accurate search results than the random sparse lifting approach. In doing so, the compute device 100 may perform multiplication using a projection matrix (e.g., a dense floating point matrix) that has been optimized by alternatingly iterating between optimizing a hash code and optimizing the projection matrix until the hash code and the projection matrix have converged to corresponding target values. The compute device 100 may perform multiplication using a projection matrix (e.g., a dense floating point matrix) that has been adapted using an orthogonal Procrustes problem.

As indicated in block 1326, the compute device 100, in the illustrative embodiment, performs binarization of each dimensionally expanded input data vector to produce a corresponding hash code. The binarization operation is also represented in FIG. 7 (e.g., as step 714) and FIG. 10 (e.g., as step 1014). In doing so, and as indicated in block 1328, the compute device 100 may perform the binarization using a winner-take-all conversion. For example, the compute device 100 may determine, as a function of the data values in a given dimensionally expanded input vector, a threshold value (e.g., a value representative of the Nth percentage of the largest values represented in the dimensionally expanded input vector), set all data values in the dimensionally expanded input vector that satisfy (e.g., are equal to or greater than) the threshold value to one and set all data values that do not satisfy the threshold value to zero. As indicated in block 1330, the compute device 100 adds each binary dimensionally expanded vector to a cluster. In doing so, and as indicated in block 1332, the compute device 100 may determine, for each binary dimensionally expanded vector to be added, a Hamming distance from the binary dimensionally expanded vector to each cluster of a set of clusters in the memory. In doing so, in the illustrative embodiment, the compute device 100 determines a Hamming distance from the binary dimensionally expanded vector to a representative binary dimensionally expanded vector of each cluster, as indicated in block 1334. For example, and as indicated in block 1336, the compute device 100 may determine the Hamming distance to a centroid of each cluster. In block 1338, the compute device 100 may add the binary dimensionally expanded vector to the cluster having the smallest Hamming distance from the binary dimensionally expanded vector to be added. In block 1340, the compute device 100 may instead add the binary dimensionally expanded vector to a new cluster, if the closest cluster satisfies a target size (e.g., a maximum allowable number of vectors). As indicated in block 1342, the compute device 100 may designate the added binary dimensionally expanded vector as the representative binary dimensionally expanded vector for the cluster it was added to (e.g., if the cluster was created in block 1340). In doing so, the compute device 100 may write the added binary dimensionally expanded vector to a data set of cluster representatives (e.g., a database of cluster representatives in the memory), as indicated in block 1344. Subsequently, the method 1300 advances to block 1346 of FIG. 15, in which the compute device 100 writes the projection matrix to memory (e.g., the memory 104).

Figure 15:
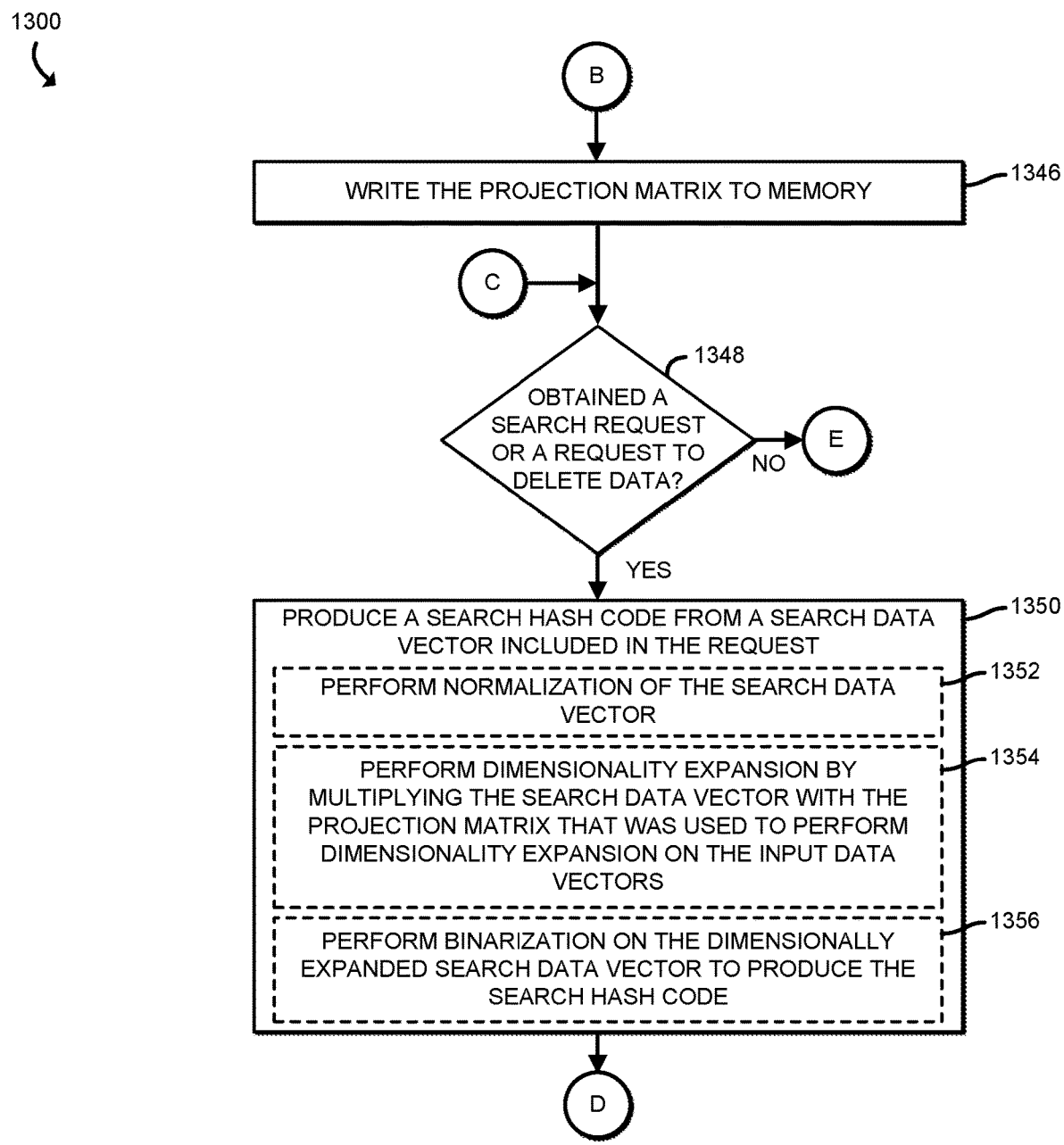

Referring now to FIG. 15, after the projection matrix has been written to memory, the method 1348 advances to block 1348, in which the compute device 100 determines whether a search request or a request to delete data has been obtained (e.g., received, such as from an application executed by the processor 102). In response to a determination that a search request or a request to delete data has not been obtained, the method 1300 loops back to block 1304 of FIG. 13 in which the compute device 100 again determines whether to add data (e.g., index additional data to be searched). Otherwise (e.g., if a search request or a request to delete data has been obtained), the method 1300 advances to block 1350, in which the compute device 100 produces a search hash code from a search data vector included in the request. That is, in the illustrative embodiment, the compute device 100 obtains a search data vector having values indicative of features of an object (e.g., an image, audio, a video, bioinformatics data, etc.) to be used in a similarity search (e.g., a stochastic similarity search) to identify data (e.g., in the memory media 110) similar to the object (e.g., to return the data to a requesting application or to delete the data). In doing so, and as indicated in block 1352, the compute device 100 performs normalization of the search data vector (e.g., similar to the operations in block 1314 of FIG. 13). Further, and as indicated in block 1354, the compute device 100, in the illustrative embodiment, performs dimensionality expansion by multiplying the search data vector with the projection matrix that was used to perform dimensionality expansion on the input data vectors (e.g., the projection matrix that was written to memory in block 1346). Additionally, in the illustrative embodiment and as indicated in block 1356, the compute device 100 performs binarization on the dimensionally expanded search data vector to produce the search hash code (e.g., the search key 410 of FIG. 4). The compute device 100, in the illustrative embodiment, performs the binarization in a process similar to the binarization process of block 1326 of FIG. 14. Subsequently, and as indicated in block 1356, the compute device 100 determines a Hamming distance between the search hash code (e.g., the search key 410) and the binary dimensionally expanded vectors in the memory (e.g., the memory media 110), such as by determining how many set bits match between the search hash code and each binary dimensionally expanded vector, as described relative to FIG. 4. Afterwards, the method 1300 advances to block 1358 of FIG. 16, in which the compute device 100 determines a Hamming distance between the search hash code (e.g., the search key 410) and the binary dimensionally expanded vectors in the memory.

Figure 16:
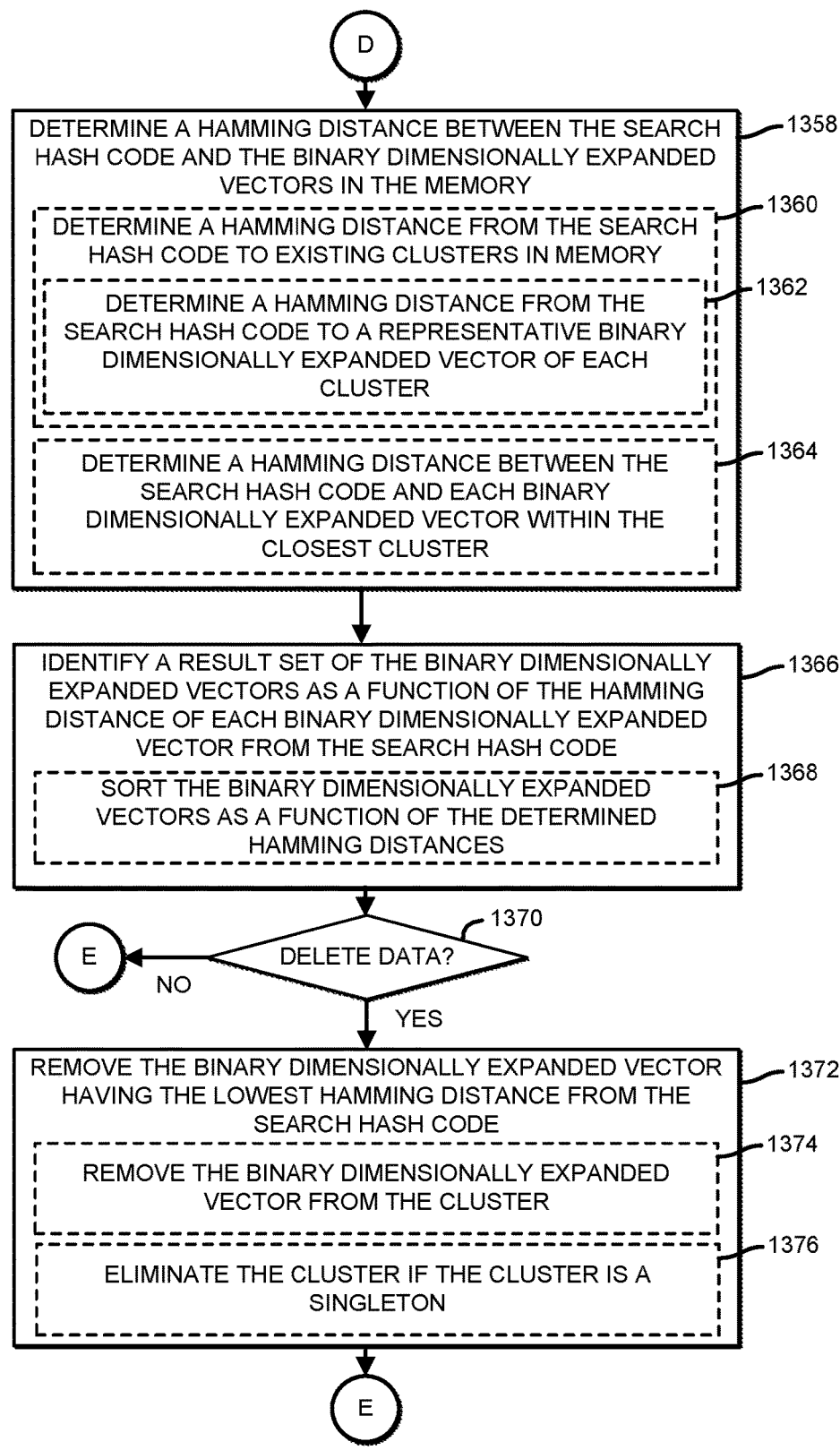

Referring now to FIG. 16, in determining the Hamming distance, the compute device 100, in the illustrative embodiment, determines a Hamming distance from the search hash code (e.g., the search key 410) to existing clusters in the memory, as indicated in block 1360. In doing so, and as indicated in block 1362, the compute device 100 may determine a Hamming distance from the search hash code to a representative binary dimensionally expanded vector of each cluster (e.g., the centroid of each cluster). As indicated in block 1364, the compute device 100 subsequently determines a Hamming distance between the search hash code and each binary dimensionally expanded vector within the closest cluster (e.g., the cluster having the lowest Hamming distance from the search hash code). Subsequently, and as indicated in block 1366, the compute device 100 identifies a result set of the binary dimensionally expanded vectors as a function of the Hamming distance of each binary dimensionally expanded vector (e.g., within the closest cluster) from the search hash code. In doing so, and as indicated in block 1368, the compute device 100 sorts the binary dimensionally expanded vectors as a function of the determined Hamming distances (e.g., from lowest distance to greatest distance).

In block 1370, the compute device 100 determines whether to delete data (e.g., whether the request in block 1348 was to delete data). If not, and having identified the result set for the search (e.g., for use by an application executed by the processor 102), the method 1300 loops back to block 1304 of FIG. 13, in which the compute device 100 determines whether to add additional data to the memory (e.g., to add more data to cluster(s)). Otherwise (e.g., if the request was to delete data), the method 1300 advances to block 1372, in which the compute device 100 removes, from the memory, the binary dimensionally expanded vector having the lowest (e.g., smallest) Hamming distance from the search hash code. In doing so, and as indicated in block 1374, the compute device 100 removes the binary dimensionally expanded vector from the corresponding cluster. As indicated in block 1376, the compute device 100 may also eliminate the cluster if the cluster is a singleton (e.g., only contained the one binary dimensionally expanded vector that was removed in block 1374). Subsequently, the method 1300 loops back to block 1304 of FIG. 13, in which the compute device 100 determines whether to add additional data to the memory (e.g., to add more data to cluster(s)). Referring now to FIGS. 17-20, pseudocode 1700, 1800, 1900, 2000 defines a set of operations that may be executed by the compute device 100 involved in similarity searches using stochastic associative memory (e.g., the memory 110) with clustering in Hamming space.

Referring now to FIGS. 21-24, given that the memory 104, 114 of the compute device 100 is column addressable, the compute device 100 may perform column writes. For example, and as indicated in the use case 2100 of FIG. 21, the compute device 100 may utilize a column write as a mechanism for column ECC (error correction codes) that needs a column write to store ECC compute bits along a column. Additionally or alternatively, when a column read is complete for a search for CONDITION A=True, the result may be marked in (e.g., written to) another column (e.g., COLUMN X) using a column write operation. In some embodiments, the compute device 100 may perform a progressive search to improve a set of search results with additional search conditions (e.g., for improved analytics). When a different column read is completed for CONDITION B=True, the results can be combined with a previous search result (e.g., by performing a logical OR, a logical XOR, etc. with the previous result set associated with CONDITION A), such as by reading the CONDITION A result set from COLUMN X and modifying the results with the result set from the search based on CONDITION B. As indicated in the use case 2200 of FIG. 22, the compute device 100 may create a redundant copy of search results into another column for future reference. If the above CONDITION A is a critical searched item, then the compute device 100 may create a redundant copy of that COLUMN X using a column write for enhancing column ECC protection. The data in COLUMN X also represents a set of last search hits (e.g., results) that can be contrasted with a subsequent set of results for the same condition (e.g., CONDITION A). In another use case 2300, shown in FIG. 23, the compute device 100 may mark or unmark updated rows since a last column read using a row write and a column write. Once a row write has been performed, the compute device 100 may set a flag bit at the COLUMN Y position within that written row. Subsequently, if a certain column read search finds COLUMN Y flag bit=True, then COLUMN Y flag bit could be reset back to 0 using column write. This process can be used for testing which writes end up being hit (e.g., identified as a search result) for a particular search. As another use case 2400, shown in FIG. 24, the compute device 100 may implement a semaphore. That is, if one condition is true, then the compute device 100 may write other conditions along a row or column of the memory. Additionally, a column write can be used to RESET that condition.

EXAMPLES

Illustrative examples of the technologies disclosed herein are provided below. An embodiment of the technologies may include any one or more, and any combination of, the examples described below.

Example 1 includes a device comprising a memory that is column addressable; circuitry connected to the memory, wherein the circuitry is to determine a Hamming distance from a binary dimensionally expanded vector to each cluster of a set of clusters of binary dimensionally expanded vectors in the memory; identify the cluster having the smallest Hamming distance from the binary dimensionally expanded vector; determine whether the identified cluster satisfies a target size; and add, in response to a determination that the identified cluster does not satisfy the target size, the binary dimensionally expanded vector to the identified cluster.

Example 2 includes the subject matter of Example 1, and wherein to determine a Hamming distance comprises to determine a Hamming distance from the binary dimensionally expanded vector to a representative binary dimensionally expanded vector of each cluster.

Example 3 includes the subject matter of any of Examples 1 and 2, and wherein to determine a Hamming distance comprises to determine a Hamming distance from the binary dimensionally expanded vector to a centroid of each cluster.

Example 4 includes the subject matter of any of Examples 1-3, and wherein the circuitry is further to add, in response to a determination that the identified cluster satisfies the target size, the binary dimensionally expanded vector to a new cluster.

Example 5 includes the subject matter of any of Examples 1-4, and wherein the circuitry is further to designate the binary dimensionally expanded vector as a representative binary dimensionally expanded vector of the new cluster.

Example 6 includes the subject matter of any of Examples 1-5, and wherein the circuitry is further to write the binary dimensionally expanded vector to a data set of cluster representatives.

Example 7 includes the subject matter of any of Examples 1-6, and wherein the circuitry is further to produce hash code from a search data vector; determine a Hamming distance between the hash code and each cluster in the memory; identify a cluster having the smallest Hamming distance from the hash code as the closest cluster; determine a Hamming distance between the search hash code and each binary dimensionally expanded vector within the closest cluster.

Example 8 includes the subject matter of any of Examples 1-7, and wherein the circuitry is further to remove, from the closest cluster, the binary dimensionally expanded vector having the smallest Hamming distance from the hash code.

Example 9 includes the subject matter of any of Examples 1-8, and wherein the circuitry is further to eliminate, in response to a determination that the closest cluster is a singleton, the closest cluster.

Example 10 includes the subject matter of any of Examples 1-9, and wherein the circuitry is further to write a column of data to the memory.

Example 11 includes the subject matter of any of Examples 1-10, and wherein to write a column of data to the memory comprises to write a column of error correction code bits to the memory. 12. The device of claim 10, wherein to write a column of data to the memory comprises to modify an existing column of data in the memory, wherein the column of data is indicative of search results.

Example 13 includes the subject matter of any of Examples 1-12, and wherein to write the column of data comprises to write a copy of search results as a column in the memory.

Example 14 includes the subject matter of any of Examples 1-13, and wherein to write the column of data comprises to write data indicative of a status of each of multiple corresponding rows of data in the memory.

Example 15 includes the subject matter of any of Examples 1-14, and wherein to write the column of data comprises to write the column of data in response to determining that a flag bit in the memory satisfies a target value.

Example 16 includes the subject matter of any of Examples 1-15, and wherein the memory has a three dimensional cross point architecture and the circuitry is further to convert an input data vector to the binary dimensionally expanded vector.

Example 17 includes a system comprising a processor; a memory that is column addressable; circuitry connected to the memory, wherein the circuitry is to determine a Hamming distance from a binary dimensionally expanded vector to each cluster of a set of clusters of binary dimensionally expanded vectors in the memory; identify the cluster having the smallest Hamming distance from the binary dimensionally expanded vector; determine whether the identified cluster satisfies a target size; and add, in response to a determination that that the identified cluster does not satisfy the target size, the binary dimensionally expanded vector to the identified cluster.

Example 18 includes the subject matter of Example 17, and wherein to determine a Hamming distance comprises to determine a Hamming distance from the binary dimensionally expanded vector to a representative binary dimensionally expanded vector of each cluster.

Example 19 includes a method comprising determining, by the device, a Hamming distance from a binary dimensionally expanded vector to each cluster of a set of clusters of binary dimensionally expanded vectors in the memory; identifying, by the device, the cluster having the smallest Hamming distance from the binary dimensionally expanded vector; determining, by the device, whether the identified cluster satisfies a target size; and adding, by the device and in response to a determination that the identified cluster does not satisfy the target size, the binary dimensionally expanded vector to the identified cluster.

Example 20 includes one or more machine-readable storage media comprising a plurality of instructions stored thereon that, in response to being executed, cause a device having a memory that is column addressable to determine a Hamming distance from a binary dimensionally expanded vector to each cluster of a set of clusters of binary dimensionally expanded vectors in the memory; identify the cluster having the smallest Hamming distance from the binary dimensionally expanded vector; determine whether the identified cluster satisfies a target size; and add, in response to a determination that that the identified cluster does not satisfy the target size, the binary dimensionally expanded vector to the identified cluster.

The invention claimed is:

1. A device comprising:
a memory that is column addressable;
circuitry connected to the memory, wherein the circuitry is to:
  determine a Hamming distance from a binary dimensionally expanded vector to each cluster of a set of clusters of binary dimensionally expanded vectors in the memory;
  identify the cluster having the smallest Hamming distance from the binary dimensionally expanded vector;
  determine whether the identified cluster satisfies a target size, wherein the determination of whether the identified cluster satisfies the target size is based on a determination that a maximum allowable number of vectors has been reached;
  add, in response to a determination that the identified cluster does not satisfy the target size where the maximum allowable number of vectors has not been reached, the binary dimensionally expanded vector to the identified cluster;
  create, in response to a determination that the identified cluster satisfies the target size where the maximum allowable number of vectors has been reached, a new cluster; and
  add, in response to the determination that the identified cluster satisfies the target size, the binary dimensionally expanded vector to the new cluster.

2. The device of claim 1, wherein to determine a Hamming distance comprises to determine a Hamming distance from the binary dimensionally expanded vector to a representative binary dimensionally expanded vector of each cluster.

3. The device of claim 1, wherein to determine a Hamming distance comprises to determine a Hamming distance from the binary dimensionally expanded vector to a centroid of each cluster.

4. The device of claim 1, wherein the circuitry is further to manage one or more operations to: add the binary dimensionally expanded vector to the identified cluster, create the new cluster, add the binary dimensionally expanded vector to the new cluster, remove of the binary dimensionally expanded vector from an existing cluster.

5. The device of claim 4, wherein the circuitry is further to designate the binary dimensionally expanded vector as a representative binary dimensionally expanded vector of the new cluster.

6. The device of claim 5, wherein the circuitry is further to write the binary dimensionally expanded vector to a data set of cluster representatives.

7. The device of claim 1, wherein the circuitry is further to:
  produce hash code from a search data vector;
  determine a Hamming distance between the hash code and each cluster in the memory;
  identify a cluster having the smallest Hamming distance from the hash code as the closest cluster; and
  determine a Hamming distance between the search hash code and each binary dimensionally expanded vector within the closest cluster.

8. The device of claim 7, wherein the circuitry is further to remove, from the closest cluster, the binary dimensionally expanded vector having the smallest Hamming distance from the hash code.

9. The device of claim 8, wherein the circuitry is further to eliminate, in response to a determination that the closest cluster is a singleton, the closest cluster.

10. The device of claim 1, wherein the circuitry is further to write a column of data to the memory.

11. The device of claim 10, wherein to write a column of data to the memory comprises to write a column of error correction code bits to the memory.

12. The device of claim 10, wherein to write a column of data to the memory comprises to modify an existing column of data in the memory, wherein the column of data is indicative of search results.

13. The device of claim 10, wherein to write the column of data comprises to write a copy of search results as a column in the memory.

14. The device of claim 10, wherein to write the column of data comprises to write data indicative of a status of each of multiple corresponding rows of data in the memory.

15. The device of claim 10, wherein to write the column of data comprises to write the column of data in response to determining that a flag bit in the memory satisfies a target value.

16. The device of claim 1, wherein the memory has a three dimensional cross point architecture and the circuitry is further to convert an input data vector to the binary dimensionally expanded vector.

17. A system comprising:
a processor;
a memory that is column addressable;
circuitry connected to the memory, wherein the circuitry is to:
  determine a Hamming distance from a binary dimensionally expanded vector to each cluster of a set of clusters of binary dimensionally expanded vectors in the memory;
  identify the cluster having the smallest Hamming distance from the binary dimensionally expanded vector;
  determine whether the identified cluster satisfies a target size, wherein the determination of whether the identified cluster satisfies the target size is based on a determination that a maximum allowable number of vectors has been reached;
  add, in response to a determination that the identified cluster does not satisfy the target size where the maximum allowable number of vectors has not been reached, the binary dimensionally expanded vector to the identified cluster;
  create, in response to a determination that the identified cluster satisfies the target size where the maximum allowable number of vectors has been reached, a new cluster; and
  add, in response to the determination that the identified cluster satisfies the target size, the binary dimensionally expanded vector to the new cluster.

18. The system of claim 17, wherein to determine a Hamming distance comprises to determine a Hamming distance from the binary dimensionally expanded vector to a representative binary dimensionally expanded vector of each cluster.

19. A method comprising:
determining, by the device, a Hamming distance from a binary dimensionally expanded vector to each cluster of a set of clusters of binary dimensionally expanded vectors in the memory;

identifying, by the device, the cluster having the smallest Hamming distance from the binary dimensionally expanded vector;

determining, by the device, whether the identified cluster satisfies a target size, wherein the determination of whether the identified cluster satisfies the target size is based on a determination that a maximum allowable number of vectors has been reached;

adding, by the device and in response to a determination that the identified cluster does not satisfy the target size where the maximum allowable number of vectors has not been reached, the binary dimensionally expanded vector to the identified cluster;

creating, in response to a determination that the identified cluster satisfies the target size where the maximum allowable number of vectors has been reached, a new cluster; and adding, in response to the determination that the identified cluster satisfies the target size, the binary dimensionally expanded vector to the new cluster.

20. One or more non-transitory machine-readable storage media comprising a plurality of instructions stored thereon that, in response to being executed, cause a device having a memory that is column addressable to:

determine a Hamming distance from a binary dimensionally expanded vector to each cluster of a set of clusters of binary dimensionally expanded vectors in the memory;

identify the cluster having the smallest Hamming distance from the binary dimensionally expanded vector;

determine whether the identified cluster satisfies a target size, wherein the determination of whether the identified cluster satisfies the target size is based on a determination that a maximum allowable number of vectors has been reached;

add, in response to a determination that the identified cluster does not satisfy the target size where the maximum allowable number of vectors has not been reached, the binary dimensionally expanded vector to the identified cluster;

create, in response to a determination that the identified cluster satisfies the target size where the maximum allowable number of vectors has been reached, a new cluster; and add, in response to the determination that the identified cluster satisfies the target size, the binary dimensionally expanded vector to the new cluster.

* * * * *